(12) United States Patent
Roh et al.

(10) Patent No.: US 8,525,727 B2
(45) Date of Patent: Sep. 3, 2013

(54) POSITION AND VELOCITY UNCERTAINTY METRICS IN GNSS RECEIVERS

(75) Inventors: June Chul Roh, Allen, TX (US); Deric Wayne Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 600 days.

(21) Appl. No.: 12/648,846

(22) Filed: Dec. 29, 2009

(65) Prior Publication Data

US 2011/0156954 A1  Jun. 30, 2011

(51) Int. Cl.
*G01S 19/37* (2010.01)
*G01S 19/52* (2010.01)
*G01S 19/24* (2010.01)

(52) U.S. Cl.
USPC ............. 342/357.77; 342/357.35; 342/357.63

(58) Field of Classification Search
USPC ............. 342/357.35, 357.63, 357.68, 357.69, 342/357.75–357.77, 357.78, 357.61
See application file for complete search history.

(56) References Cited

U.S. PATENT DOCUMENTS

| 5,883,595 | A | * | 3/1999 | Colley | .................... | 342/357.29 |
| 6,204,806 | B1 | | 3/2001 | Hoech | | |
| 7,362,265 | B2 | | 4/2008 | Weill | | |
| 7,555,262 | B2 | * | 6/2009 | Brenner | ........................ | 455/12.1 |

OTHER PUBLICATIONS

Kaplan et al., ed., Understanding GPS: Principles and Applications, (Artech House, 2006); Chapter 5, Appendix A.
Braasch et al., "GPS Receiver Architectures and Measurements", Proceedings of the IEEE, vol. 87, No. 1 (Jan. 1999), pp. 48-64.
Levy, "The Kalman Filter: Navigation's Integration Workhorse", Innovation, available at http://www.cs.unc.edu/~welch/kalman/Levy1997/index.html.

* cited by examiner

*Primary Examiner* — Cassie Galt
(74) *Attorney, Agent, or Firm* — Ronald O. Neerings; W. James Brady; Frederick J. Telecky, Jr.

(57) ABSTRACT

A GNSS navigation system and navigation method for determining user position, user velocity, and improved uncertainty metrics for position and velocity. A measurement engine in an applications processor of the system determines pseudorange and delta range values over each time period for each received satellite signal, and also determines measurement noise variances for both pseudorange and delta range for the individual signals. The satellite-specific pseudorange and delta range measurement variances are used to determine the position and velocity uncertainties by a position engine, either by way of a least-squares linearization or by way of an enhanced Kalman filter. The uncertainties may be communicated to the system user, or used in generating an integrated position and velocity result from both the GNSS navigation function and an inertial navigation system result.

36 Claims, 13 Drawing Sheets

POSITION AND VELOCITY UNCERTAINTY METRICS IN GNSS RECEIVERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of satellite navigation. Embodiments of this invention are directed to Global Navigation Satellite System (GNSS) receivers, such as of the Global Positioning System (GPS) type, and to improved estimation of position and velocity obtained by such receivers comprehending measurement uncertainties.

In recent years, satellite navigation equipment has become widespread. Sophisticated navigation systems for large-scale vehicles such as aircraft and ships, and positioning systems for map and survey functions, were the first implementations of GNSS technology. In recent years, however, GPS receivers have been implemented in relatively modest applications, including many consumer automobiles, add-on navigation systems for automobiles, and handheld navigation systems for hikers. Indeed, GPS systems are now included in golf carts to provide golfers with accurate distance information, and are now commonplace in mobile telephone handsets.

GNSS technology, currently implemented by way of the GPS system, has many advantages over previous navigation systems, particularly land-based systems such as LOng-RAnge Navigation (LORAN) systems. GPS signals can be used at all times of the day and night, and are not greatly affected by weather or atmospheric conditions. Line-of-sight transmission and worldwide coverage are facilitated by the number and positions of transmitting satellites in orbit. The GPS system also provides both position and velocity information to the user. Varying degrees of position and velocity accuracy are available, enabling a large number of users of inexpensive receivers, while still allowing sophisticated users to obtain a higher level of accuracy.

In a general sense, by way of background, GPS navigation is based on triangulation of the receiver location using signals received from multiple satellites of known location, in which the received signals are effectively time-stamped with the time of transmission. More specifically, GPS satellites periodically transmit a pseudo-random number (PRN) sequence via a spread-spectrum signal, in which the transmitted value of the frame boundaries of the data modulating the PRN sequence, as well as the PRN sequence itself, has a deterministic relationship to a known time (i.e., the beginning of the GPS "week"); as such, the received data from the satellites effectively include a time stamp. From the PRN value, GPS receivers determine the signal propagation time from the satellite to the receiver and, multiplying that propagation time by the speed of light, determine a measured distance (the "pseudorange") of the receiver from each of the multiple satellites. Typically, the pseudoranges from four or more satellites of known position, in an earth-centered earth-fixed coordinate system, are then triangulated by solving a system of position equations, to determine the position of the receiver in that coordinate system.

FIG. 1 illustrates, in an idealized 2-D representation, the fundamental concept of GPS triangulation. In this illustration, each of satellites SAT1, SAT2, SAT3 have transmitted a time-stamped signal that is received by a synchronized receiver at an unknown location. By subtracting the time of transmission indicated in the signal time stamp from the time of receipt, and multiplying that difference by the speed of light, the receiver can estimate its distance r1, r2, r3 from respective satellites SAT1, SAT2, SAT3 of known position within the coordinate system being used. Computational circuitry within the receiver can then identify point RLOC in that coordinate system at which all of the estimated distances r1, r2, r3 coincide, to a best approximation. In the 3-D sense, each radial distance r1, r2, r3 from satellites SAT1, SAT2, SAT3 will of course define a sphere, requiring either four or more satellites or extrinsic information (e.g., knowing that location RLOC is on the surface of the earth) to resolve a unique receiver location RLOC.

As known in the art and as mentioned above, the geometric "range", or distance, r from a GPS satellite to a GPS receiver corresponds to the propagation time between the transmission time $T_s$ at the satellite and the receipt time $T_u$ at the user, multiplied by the speed of light c:

$$r = c(T_u - T_s) = c\Delta t$$

The "pseudorange" that can be determined by the GPS receiver necessarily involves consideration of the time offset $t_u$ between the time at the receiver and the true reference time ("system time"), and the time offset $\delta t$ between the time at the satellite and system time. As such, the pseudorange $\rho$ considering these time offsets can be expressed as:

$$\rho = c[(T_u + t_u) - (T_s + \delta t)]$$
$$= c(T_u - T_s) + c(t_u - \delta t)$$
$$= r + c(t_u - \delta t)$$

Or, in coordinate space, defining s as the vector from the origin (i.e., center of the earth, in an earth-centered coordinate system) to the satellite, u as the vector from the origin to the receiver location, and r as the vector from the receiver location to the satellite corresponding to the vector difference s−u:

$$\rho - c(t_u + \delta t) = \|s - u\|$$

Pseudorange $\rho$ and the time offset values are measurable or otherwise knowable, thus allowing solution of the actual range. And considering that the GPS network itself now determines corrections for the satellite clock offset $\delta t$ from system time, and transmits those corrections to the satellites for rebroadcast to receivers, satellite clock offset $\delta t$ is effectively compensated for at the receiver, such that:

$$\rho - ct_u = \|s - u\|$$

Conventional GPS systems determine the user position (i.e., receiver location RLOC in FIG. 1) based on pseudorange measurements to four or more satellites, giving rise to a system of equations (one for each satellite):

$$\rho_j = \|s_j - u\| + ct_u$$

where j is the satellite index. For a system of four satellites (j=1, 2, 3, 4) in which satellite j is at position $(x_j, y_j, z_j)$ in the coordinate system, the pseudoranges $\rho_j$ can be expressed into a system of equations in which the unknowns include the user (receiver) position $(x_u, y_u, z_u)$ and the user time offset $t_u$:

$$\rho_1 = \sqrt{(x_1-x_u)^2+(y_1-y_u)^2+(z_1-z_u)^2} + ct_u$$

$$\rho_2 = \sqrt{(x_2-x_u)^2+(y_2-y_u)^2+(z_2-z_u)^2} + ct_u$$

$$\rho_3 = \sqrt{(x_3-x_u)^2+(y_3-y_u)^2+(z_3-z_u)^2} + ct_u$$

$$\rho_4 = \sqrt{(x_4-x_u)^2+(y_4-y_u)^2+(z_4-z_u)^2} + ct_u$$

Theoretically, of course, this system of four equations and four unknowns has a unique solution. In practice, however, each pseudorange measurement includes some amount of noise or error. In the presence of such noise, according to conventional techniques, this system of nonlinear equations can be solved, to derive user position $(x_u, y_u, z_u)$ and user time offset $t_u$, by way of iterative techniques such as least squares minimization applied to a linearization of these non-linear equations, or through the use of Kalman filtering over a time sequence of the pseudorange measurements.

It is useful, for purposes of comprehension, to describe the operation of an example of the linearization approach to the solution of this system of equations. As known in the art, linearization can be carried out with reasonable accuracy from an approximate position $(\hat{x}_u, \hat{y}_u, \hat{z}_u)$, for example as may be determined by cellular positioning or other known methods. In the absence of assistance (i.e., via "assisted GPS" as known in the art), the initial approximate position can be taken as the center of the earth; as such, the approximate position need not be very accurate. The offset of the true user position $(x_u, y_u, z_u)$ from this approximate position can then be denoted by a displacement $(\Delta x_u, \Delta y_u, \Delta z_u)$. Taylor expansion of each of the set of pseudorange $\rho_j$ equations allows this displacement or position offset $(\Delta x_u, \Delta y_u, \Delta z_u)$ to be expressed as linear functions of the known coordinates and the pseudorange measurements. With a pseudorange $\rho_j$ represented by:

$$\rho_j = \sqrt{(x_j - x_u)^2 + (y_j - y_u)^2 + (z_j - z_u)^2} + ct_u$$
$$= f(x_u, y_u, z_u, t_u)$$

one can calculate an approximate pseudorange $\hat{\rho}_u$ using the approximate position $(\hat{x}_u, \hat{y}_u, \hat{z}_u)$ and a time bias estimate $\hat{t}_u$:

$$\hat{\rho}_j = \sqrt{(x_j - \hat{x}_u)^2 + (y_j - \hat{y}_u)^2 + (z_j - \hat{z}_u)^2} + c\hat{t}_u$$
$$= f(\hat{x}_u, \hat{y}_u, \hat{z}_u, \hat{t}_u)$$

Each component of the true user position $(x_u, y_u, z_u)$ and receiver clock offset $t_u$ can be expressed as the sum of an approximate component and an incremental component:

$$x_u = \hat{x}_u + \Delta x_u$$

$$y_u = \hat{y}_u + \Delta y_u$$

$$z_u = \hat{z}_u + \Delta z_u$$

$$t_u = \hat{t}_u + \Delta t_u$$

in which case:

$$f(x_u, y_u, z_u, t_u) = f(\hat{x}_u + \Delta x_u, \hat{y}_u + \Delta y_u, \hat{z}_u + \Delta z_u, \hat{t}_u + \Delta t_u)$$

This function $f(x_u, y_u, z_u, t_u)$ can be expanded about the approximate position and time bias estimate $(\hat{x}_u, \hat{y}_u, \hat{z}_u, \hat{t}_u)$ using a Taylor series and truncating the partial derivative terms after the first-order expressions, so that the pseudoranges $\rho_j$ can be expressed as:

$$\rho_j = \hat{\rho}_j - \frac{x_j - \hat{x}_u}{\hat{r}_j}\Delta x_u - \frac{y_j - \hat{y}_u}{\hat{r}_j}\Delta y_u - \frac{z_j - \hat{z}_u}{\hat{r}_j}\Delta z_u + ct_u$$

where $\hat{r}_j$ is defined as:

$$\hat{r}_j = \sqrt{(x_j - \hat{x}_u)^2 + (y_j - \hat{y}_u)^2 + (z_j - \hat{z}_u)^2}$$

Introducing shorthand variables $a_{xj}$, $a_{yj}$, $a_{zj}$ as follows:

$$a_{xj} = \frac{x_j - \hat{x}_u}{\hat{r}_j}$$

$$a_{yj} = \frac{y_j - \hat{y}_u}{\hat{r}_j}$$

$$a_{zj} = \frac{z_j - \hat{z}_u}{\hat{r}_j}$$

and defining pseudorange difference $\Delta\rho = \rho_j - \hat{\rho}_j$, one can express the set of linear equations to be solved, based on range measurements to four satellites, as:

$$\Delta\rho_1 = a_{x1}\Delta x_u + a_{y1}\Delta y_u + a_{z1}\Delta z_u - ct_u$$

$$\Delta\rho_2 = a_{x2}\Delta x_u + a_{y2}\Delta y_u + a_{z3}\Delta z_u - ct_u$$

$$\Delta\rho_3 = a_{x3}\Delta x_u + a_{y3}\Delta y_u + a_{z4}\Delta z_u - ct_u$$

$$\Delta\rho_4 = a_{x4}\Delta x_u + a_{y4}\Delta y_u + a_{z4}\Delta z_u - ct_u$$

By expressing the coefficients and variables in matrix form:

$$\Delta\rho = \begin{bmatrix} \Delta\rho_1 \\ \Delta\rho_2 \\ \Delta\rho_3 \\ \Delta\rho_4 \end{bmatrix}; H = \begin{bmatrix} a_{x1} & a_{y1} & a_{z1} & 1 \\ a_{x2} & a_{y2} & a_{z2} & 1 \\ a_{x3} & a_{y3} & a_{z3} & 1 \\ a_{x4} & a_{y4} & a_{z4} & 1 \end{bmatrix}; \Delta x = \begin{bmatrix} \Delta x_u \\ \Delta y_u \\ \Delta z_u \\ -c\Delta t_u \end{bmatrix}$$

the system of equations can be expressed as:

$$\Delta\rho = H\Delta x$$

and, in theory, can be solved for the vector of position and time displacement $\Delta x$ from the estimated position and time offset via:

$$\Delta x = H^+ \Delta p$$

where $H^+$ represents a pseudoinverse of linearized derivative matrix H, calculated according to the particular solution technique (e.g., least-squares, weighted least-squares, etc.).

In similar fashion, GPS navigation provides the capability of determining the three-dimensional user velocity $\dot{u}$ as an approximation of the time rate of change of the calculated user position u over a time interval:

$$\dot{u} = \frac{du}{dt} = \frac{u(t_2) - u(t_1)}{t_2 - t_1}$$

Doppler shifts in the frequencies of the received satellite signals are analyzed to solve the velocity problem, in many modern GPS receivers. In a linearization approach similar to that described above for determining the user position, a variable $d_j$ is used for the $j^{th}$ satellite signal:

$$d_j = \dot{x}_u a_{xj} + \dot{y}_u a_{yj} + \dot{z}_u a_{zj} - c\dot{t}_u$$

For signals received from four satellites, a system of four equations in the four unknowns (i.e., the derivative terms $\dot{x}_u$, $\dot{y}_u$, $\dot{z}_u$, $\dot{t}_u$) can be expressed in matrix form:

$$d = Hg$$

where $g^T = [\dot{x}_u\ \dot{y}_u\ \dot{z}_u\ \dot{t}_u]$, permitting solution of vector g from this system via:

$$g = H^+ d$$

As mentioned above, in practice, these calculations by way of which GPS systems can determine a user position and a user velocity are corrupted by noise in the signal. Referring to user position, the measured pseudoranges ρ amount to a sum of the computed pseudoranges h(x), based on the true user position and time offset vector x, with a composite measurement noise vector v:

$$\rho = h(x) + v$$

For the least-squares solution method, the linearized system of equations including the effects of noise is more accurately expressed as:

$$\Delta\rho = H\Delta x + v$$

and, in theory, can be solved for the vector of position and receiver clock bias Δx from the estimated position and time offset via:

$$\Delta\hat{x} = H^+ \Delta\rho$$

where $$\Delta\hat{x} = \Delta x + e = (x - \hat{x}) + e$$

$\hat{x}$ being the estimated user position and receiver clock bias, and e representing the position-domain error caused by the measurement noise v in the pseudorange measurements, as applied to the derivative matrix H:

$$e = H^+ v$$

Measurement noise vector v of the signals as received from the satellites depends on such factors as pure measurement noise, errors included within the applicable model considered by the receiver, and any unmodeled effects. In conventional GPS systems, to the extent that random variables are included within vector v, those random variables are typically modeled as uncorrelated with one another, and as having equal variances over satellite signals.

It is contemplated, however, according to this invention, that the equal variance assumption is invalid in many practical situations. For example, a GPS receiver located within an "urban canyon" will receive GPS signals from some satellites in highly attenuated form, if not completely blocked by the surrounding buildings. In this case, some of the satellite signals received by that GPS receiver may be reflected signals, or may be received over multiple paths because of the reflections (i.e., multipath signal transmission). According to this invention, it is contemplated that these suboptimal received satellite signals will have a measurement noise vector v that is time-varying due to the changing channel environment as the user moves through the physical environment. These signals will have unequal variances among one another, and will generally exhibit time-varying non-zero biases. As such, it has been observed, in connection with this invention, that treatment of the random variables in the measurement noise vector v as uncorrelated and having equal variances will lead to inaccurate position and velocity determinations.

BRIEF SUMMARY OF THE INVENTION

Embodiments of this invention provide a system and method of determining realistic uncertainty measurements for signals received from each of multiple navigation satellites, such as in the GPS system.

Embodiments of this invention provide such a system and method in which the uncertainty measurements are useful for calculating either or both the position and the velocity of the receiver.

Embodiments of this invention provide such a system and method in which multipath effects due to satellite signal reflection are accurately estimated and weighted in determining position and velocity.

Embodiments of this invention provide such a system and method that is compatible for use with Kalman filter-based solution techniques.

Embodiments of this invention provide such a system and method in which the uncertainty measurements for each satellite are useful in balancing the weight assigned to GPS versus other position-determining technologies in determining position and velocity.

Other objects and advantages of this invention provided by embodiments of this invention will be apparent to those of ordinary skill in the art having reference to the following specification together with its drawings.

Embodiments of this invention may be implemented into receiver circuitry for a mobile device, such as a mobile telephone handset, portable GPS receiver, automobile or other vehicle navigation system, and the like. The receiver circuitry includes a measurement engine that processes received GPS or GNSS signals from multiple satellites, and that provides separate independent estimates of pseudorange and "delta range" (i.e., time derivative of pseudorange) measurement noise variances for each of the received satellite signals. A position engine receives the pseudorange and delta range measurements, and the estimated measurement noise variances for each satellite, from the measurement engine, and processes those measurements and variance estimates to derive position or velocity results, or both, of improved accuracy, and uncertainty values corresponding to those position and velocity determinations that accurately reflect current signal conditions.

According to one aspect of the invention, the measurement engine determines the pseudorange measurement noise variance for each satellite signal based on a discriminator output signal in a delay-locked loop. The discriminator output determines the relative time position of the received demodulated satellite signal based on one or more correlations of that signal with a replica code. The correlations in the delay-locked loop are adjusted by the discriminator output, and a pseudorange measurement noise variance is determined based on the variance of that discriminator output signal over time. A delta range measurement noise variance for each satellite signal can also be determined from the variance in a discriminator output signal in a frequency-locked loop (or phase-locked loop), in which one or more correlations of the received signal with a replica code are performed. The pseudorange and delta range measurements, and the measurement noise variance for each of those measurements, are then used by the position engine in determining position, velocity, and uncertainties in those position and velocity determinations.

According to another aspect of the invention, the pseudorange measurement noise variance and/or delta range measurement noise variance are determined, by the measurement engine, in a manner that contemplates the effects of correlation bias due to multipath effects in one or more of the received satellite signals.

According to another aspect of the invention, the measurements of pseudorange, delta range, pseudorange measurement noise variance, and delta range measurement noise variance, for the signals from each of the satellites are applied by the position engine according to a Kalman filter approach, such that the determination of position and velocity, and their corresponding uncertainties, are obtained in a time-filtered manner.

According to another aspect of the invention, the position engine incorporates dynamic estimates of process noise, for example as based on user dynamics, in determining the position and velocity uncertainties.

DETAILED DESCRIPTION OF THE INVENTION

The present invention will be described in connection with its preferred embodiment, namely as implemented into a mobile Global Positioning System (GPS) receiver such as a personal navigation device, because it is contemplated that this invention will be especially beneficial in such an application, and in other similar handheld devices such as mobile telephone handsets with GPS capability, and the like. However, those skilled in the art having reference to this specification will readily comprehend that embodiments of this invention may be beneficially implemented in a wide range of Global Navigation Satellite System (GNSS) receivers other than in such handheld devices, including surveying instrumentation, navigation systems deployed in larger-scale vehicles and vessels, and the like. Accordingly, it is to be understood that the following description is provided by way of example only, and is not intended to limit the true scope of this invention as claimed.

Figure 1:
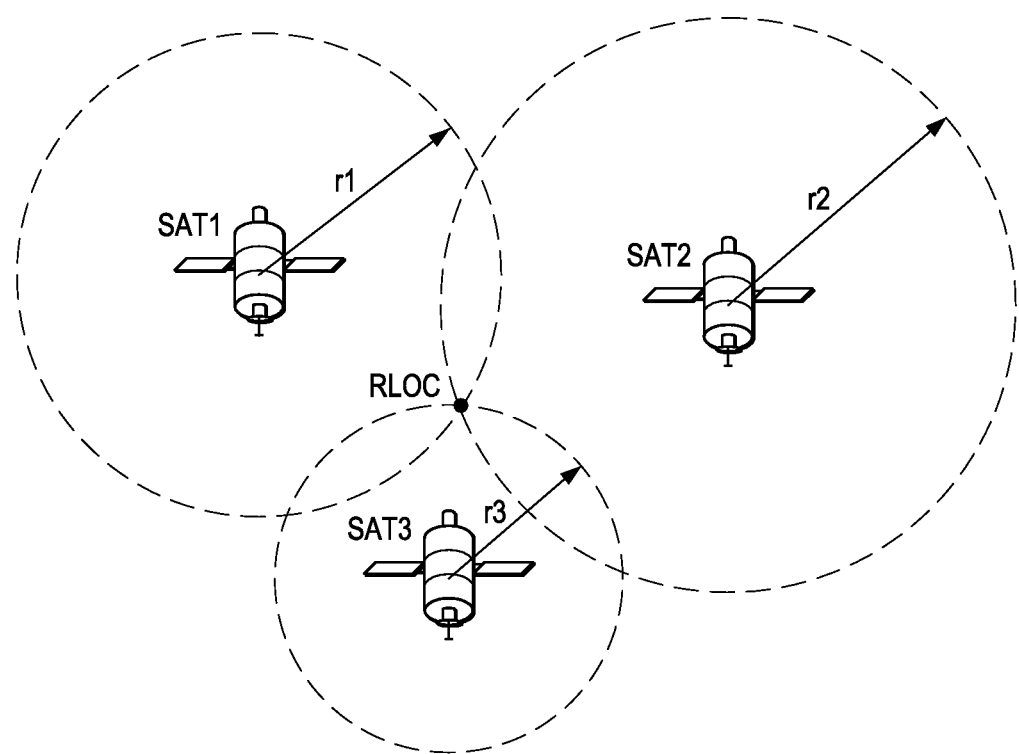
FIG. 1 is a conceptual diagram illustrating the operation of conventional GPS navigation in a general sense.
Figure 2:
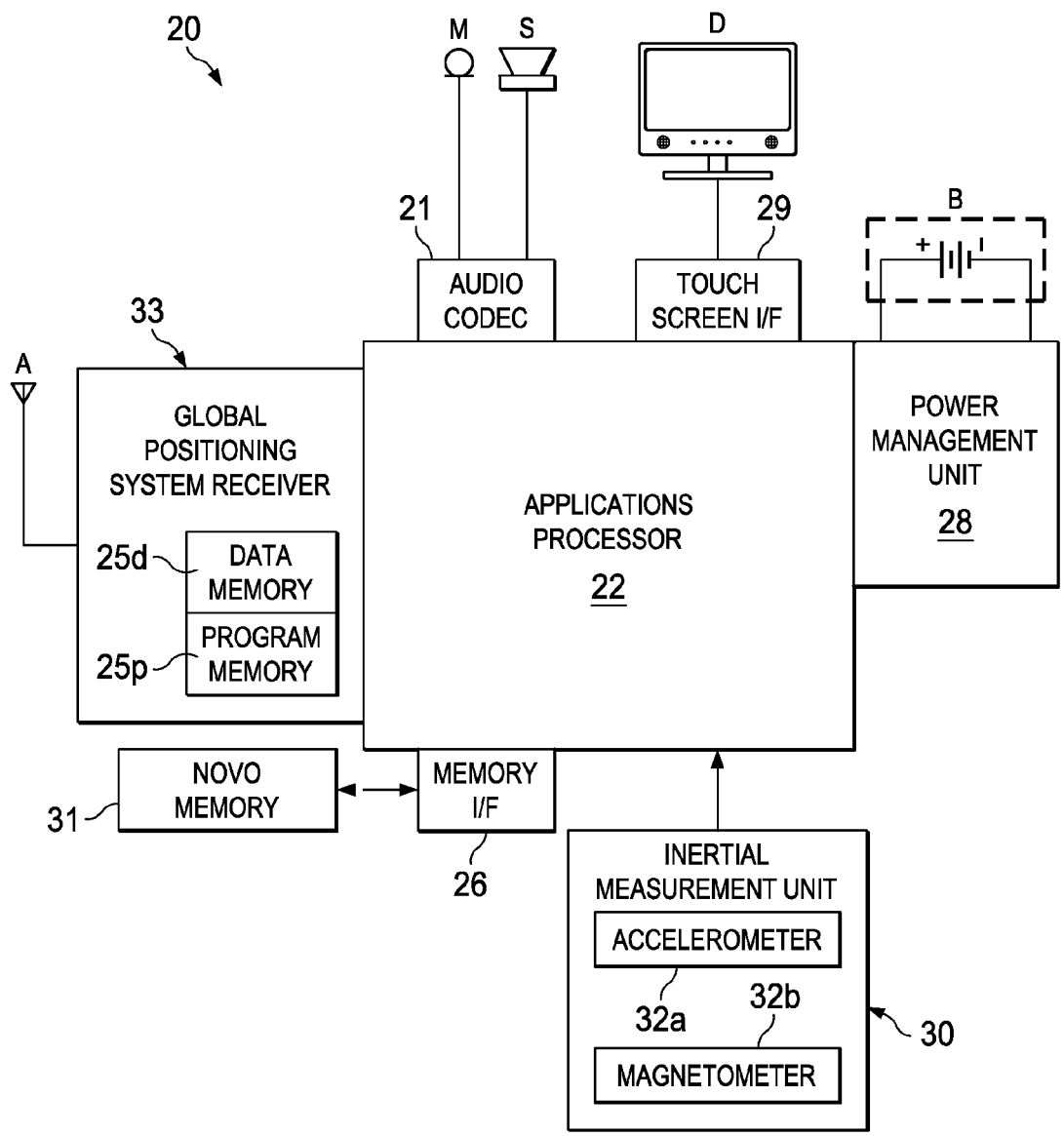
FIG. 2 is an electrical diagram, in block form, of a navigation system constructed according to embodiments of this invention.

Referring now to FIG. 2, the construction of an electronic system according to an embodiment of this invention will now be described, by way of navigation system 20. Navigation system 20 may correspond to a stand-alone handheld or automotive navigation device (i.e., a "personal navigation device"), to a larger-scale navigation system in a large vehicle, and in any of these applications may be combined with other functions in a multipurpose device. For example, modern mobile telephone handsets referred to as "smartphones" often include GPS capability, and can thus serve as navigation system 20. For purposes of this specification, it is contemplated that navigation system 20, shown in FIG. 2 by way of example, can correspond to any such realizations; of course, if navigation system 20 is a mobile telephone handset, it will also include such functionality necessary to carry out that and any other primary or ancillary functions. As such, the description of navigation system 20 in this specification is not intended to be interpreted in any limited sense.

As shown in FIG. 2, the digital functionality controlling the operation of navigation system 20 is centered on applications processor 22, which is a conventional single or multiple processor core integrated circuit device, such as an OMAP4xxx applications processor or an AM35x ARM-based processor, both types of processors available from Texas Instruments Incorporated. As known in the art, such applications processors are capable of managing functions and applications including GPS position and velocity determinations, and can also manage other functions and operations as desired, such as mobile telephony, digital camera functions, data and multimedia wireless communications, audio and video streaming, storage, and playback, and the like. As such, applications processor 22 in navigation system 20 provides substantial computational power. As typical in conventional navigation systems, applications processor 22 includes or has access to program memory that stores computer-executable instructions and software routines that, when executed by applications processor 22, carries out certain functions executed by navigation system 20 according to embodiments of this invention. Applications processor 22 also includes or has access to data memory that stores the results of its various processing routines and functions. Of course, other architectures and capabilities (lesser or greater) may be realized by applications processor 22 within navigation system 20 in this embodiment of the invention.

Applications processor 22 cooperates with various interface functions within navigation system 20, some of which are shown in FIG. 2. Audio codec 21 manages the acquisition of audio input from microphone M and the communication of audio signals to applications processor 22, and also the output of signals from application processor 22 as audio output via speaker S. Touchscreen interface 29 provides the appropriate graphics interface between applications processor 22 and touchscreen D, as well as receiving, processing, and forwarding user inputs entered via touchscreen D.

Navigation system 20 is powered from battery B, under the control and management of power management unit (PMU) 28. PMU 28 may be realized as a separate integrated circuit (from applications processor 22), to control and apply the appropriate system power from battery B to applications processor 22 and the other functions within navigation system 20, including any necessary regulated internal voltages. PMU 28, as typical in the art, also can include power savings functionality, an interface to an on/off switch, a display of a remaining-battery-power indication, and the like.

Navigation system 20 according to this example includes inertial navigation functionality, to determine one or both of the user position and velocity according to measurements obtained by inertial measurement unit 30. Inertial measurement unit 30 includes one or more transducers capable of sensing the position or movement of navigation system 20. As shown in FIG. 2, inertial measurement unit 30 includes accelerometer 32a and magnetometer 32b. As known in the art, accelerometer 32a detects physical movement of navigation system 20, while magnetometer 32b can detect the earth's magnetic field and movement therewithin, in compass fashion. Other transducers such those useful to provide the function of an altimeter, gyroscope navigation, a humidity sensor, and the like can also be included in inertial measurement unit 30, as known in the art. Conventional navigation functions and operations carried out by applications processor 22 based on such measurements can deduce the position of navigation system 20.

Any or all of the various peripheral functions of navigation system 20 may be realized in one or more separate integrated circuits from the integrated circuit realizing applications processor 22. Alternatively, some or more of these functions may be implemented into a single integrated circuit along with applications processor 22.

As shown in FIG. 2, navigation system 20 according to embodiments of this invention includes Global Positioning System (GPS) receiver 33 that is coupled to antenna A to receive GPS signals from satellites in orbit, and that is coupled to applications processor 22 to forward those signals to applications processor 22 for navigation processing. GPS receiver 33 refers to one or more integrated circuits having interface circuitry to receive the incoming satellite signals, and having substantial computation capability for carrying out various operations involved in determining position and velocity based on those satellite signals. In this example, GPS receiver 33 includes multiple computational "engines" as realized by general-purpose processor capability such as that provided by dual-core ARM CORTEX A9MPCORE processors, such engines carrying out specific functions involved in the overall operation of GPS receiver 33. An example of an integrated circuit known in the art for providing GPS and assisted GPS navigation and map functions is the NL5350 NAVILINK GPS device available from Texas Instruments Incorporated. It is contemplated that GPS navigation function 35 according to embodiments of this invention can be realized by way of a single integrated circuit with computational capability similar to that provided by that NL5350 device, and constructed and programmed to perform the operations described herein. The functions of certain ones of these computational engines directed to navigation functions, according to embodiments of this invention, will be described in further detail below. As shown in FIG. 2, GPS receiver 33 includes program memory 25p, which stores computer-executable instructions and software (or "firmware") routines that, when executed by GPS receiver 33, carries out the functions executed by navigation system 20 according to embodiments of this invention. It is contemplated that program memory 25p will be realized as some form of embedded non-volatile memory such as electrically erasable programmable read-only memory (EEPROM), considering that the applications program instructions stored therein should persist after power-down of navigation system 20. Of course, program memory 25p may alternatively be realized in other ways, for example by way of a memory resource external to the integrated circuit that realizes GPS receiver 33, such as external non-volatile memory 31 in communication via memory interface 26. GPS receiver 33 also includes data memory 22d, either contained within the same integrated circuit as the processing circuitry of GPS receiver 33 or external thereto, for storing results of its various processing routines and functions. Data memory 22d may be realized as conventional volatile random access memory (RAM), or as non-volatile read/write memory such as EEPROM, or as some combination of the two.

In these embodiments of the invention, GPS receiver 33 executes program instructions, stored in program memory 25p or elsewhere, to calculate estimates of the geographical position and/or velocity of navigation system 20. In addition, as known in the art, GPS receiver 33 can also or instead provide an accurate estimate of the current time from the received GPS satellite signals. The architecture and operation of GPS receiver 33 in determining these position and velocity measurements from the GPS system, according to embodiments of this invention, will be described in further detail below.

Figure 3:
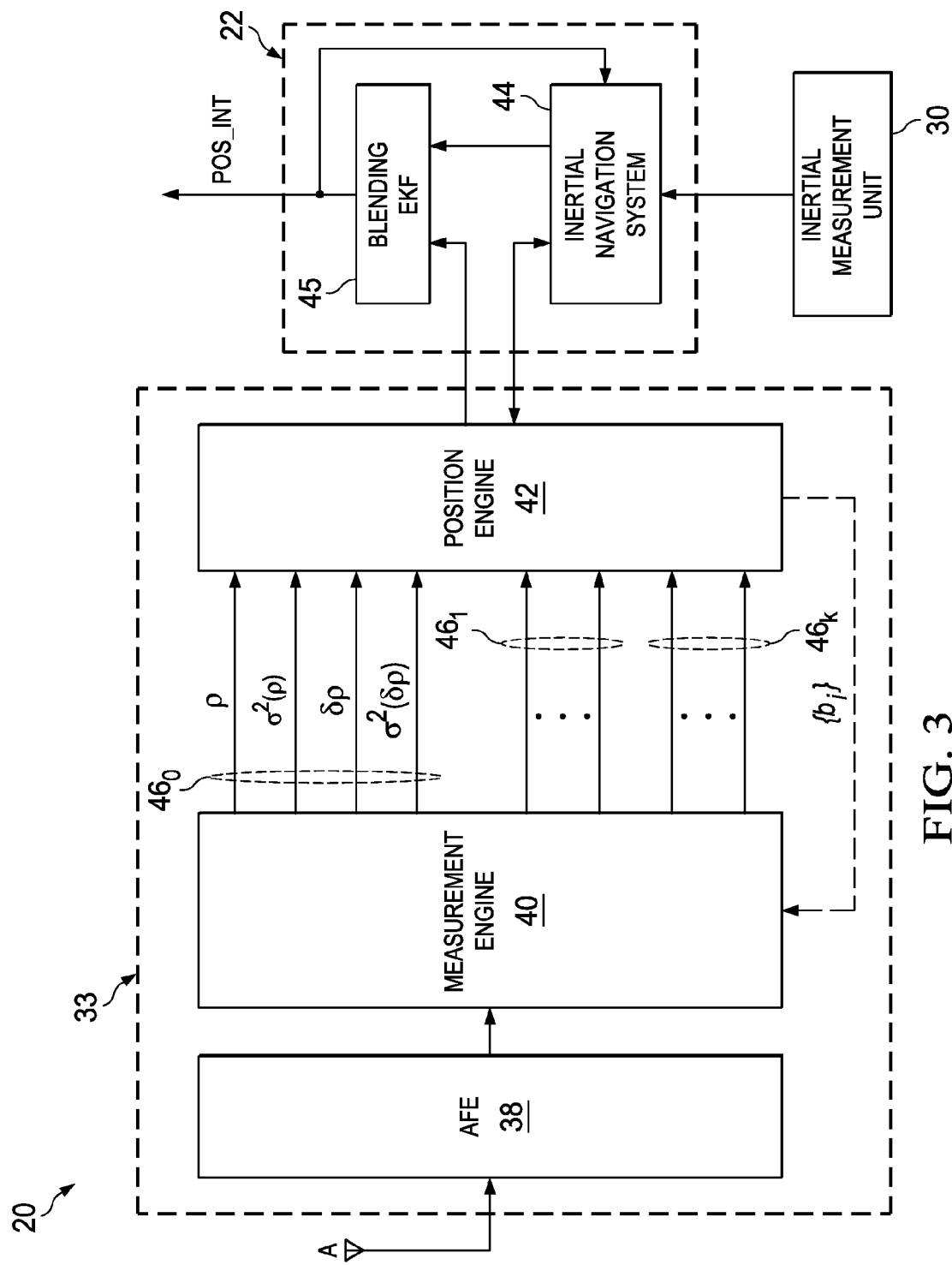
FIG. 3 is an electrical diagram, in block form, of an applications processor in the navigation system of FIG. 2 according to embodiments of this invention.

Referring now to FIG. 3, functions within navigation system 20 directed to navigation (i.e., determining one or both of position and velocity), according to embodiments of this invention, will be described in further detail. Not all functions performed by navigation system 20 are shown in FIG. 3, but rather only those functions concerned with the navigation function of embodiments of this invention are illustrated. As shown in FIG. 3, inertial measurement unit 30 communicates with applications processor 22, specifically with inertial navigation system 44, to provide inertial navigation system 44 with measurements from one or more of its inertial transducers (e.g., accelerometer, magnetometer, gyro, etc.). Inertial navigation system 44 evaluates these inertial transducer measurements in the conventional manner, to derive estimates of the current position of navigation system 20 and, perhaps also its current velocity. According to embodiments of this invention, inertial navigation system 44 forwards this position and velocity information to blending Extended Kalman Filter (EKF) function 45, for combining with GPS position and velocity information to determine an integrated position and velocity result on output POS_INT.

The cooperation between applications processor 22 and GPS receiver 33 is also shown in FIG. 3. While the GPS navigation functions illustrated in FIG. 3 are shown as being carried out within GPS receiver 33, and thus typically realized in GPS receiver 33 by way of a separate integrated circuit from other functions of applications processor 22, those skilled in the art will realize that the partitioning of the GPS functions between GPS receiver 33 and applications processor 22 may vary, depending on the particular realization. For example, the particular navigation functions shown as within GPS receiver 33 in FIG. 3 may be alternatively realized by way of one or more specific processor cores within the integrated circuit embodying applications processor 22, as may be the case.

As shown in FIG. 3, GPS receiver 33 includes analog front end (AFE) 38, which receives and processes signals from GPS satellites, specifically from multiple GPS satellites in this implementation. AFE 38 thus implements such physical layer circuitry that interfaces with antenna A, including first stage amplification and the like. AFE 38 performs conventional downconversion of the received GPS signals, analog filtering, automatic gain control (AGC), analog to digital conversion, and other conventional analog domain processing. AFE 38 may also include some digital functionality, as known in the art. The received and processed signals from AFE 38 are coupled to measurement engine 40, according to embodiments of this invention, for processing and computations in the digital domain on the processed signals received at antenna A from multiple GPS satellites.

Measurement engine 40 may be realized as customized hardware or logic, or as programmable logic executing computer program instructions stored in program memory 25p (FIG. 2) or elsewhere, or some combination thereof, for carrying out the computations and processing of received digitized GPS satellite signals in the manner described in this specification. In particular, in the embodiment of the invention illustrated in FIG. 3, measurement engine 40 is operable to receive one or more digital data streams from AFE 38 including digital versions of the signals received from the GPS satellites, and to process those data streams into estimates of "pseudorange" and "delta range", and estimates of measurement noise variances of the "pseudorange" and "delta range" values, for each of the individual received satellite signals. It is contemplated that those skilled in the art having reference to this specification, and particularly those portions of this specification that describe the functions and operations carried out by measurement engine 40, will be readily able to realize measurement engine 40 in a manner suitable for their particular applications, without undue experimentation.

As shown in FIG. 3, measurement engine 40 produces signal groups $46_0$ through $46_k$, each associated with a corresponding received satellite signal, and each forwarded to position engine 42. Typically, signals from four or more satellites are processed by measurement engine 40, with the number of signal groups 46 varying accordingly. Each signal group 46 includes separate signals for the various measurements and metrics, according to embodiments of this invention. For example, as shown in FIG. 3 relative to signal group $46_0$ for a corresponding individual satellite and received signal, measurement engine 40 produces pseudorange signal $\rho$, delta range signal $\delta\rho$ (commonly referred to in the art by the symbol $\dot{\rho}$), pseudorange variance signal $\sigma^2(\rho)$, and delta range variance signal $\sigma^2(\delta\rho)$. In this embodiment of the invention, each of signal groups $46_1$, $46_2$, etc. include these same signals for a different received satellite signal (i.e., received from a different GPS satellite). While FIG. 3 illustrates the signals within each signal group 46 to be communicated in parallel, and illustrates the signal groups 46 themselves as communicated in parallel, it is contemplated that the signals communicated by measurement engine 40 may be modulated, multiplexed, or otherwise combined with one another, or alternatively stored in data memory 25d or elsewhere, or communicated in some other known manner to position engine 42. The representation of this signal communication in FIG. 3 is presented in a functional manner only; the particular physical signal communication technique from measurement engine 40 to position engine 42 is not of particular importance.

Position engine 42 is another function within GPS receiver 33, and receives signal groups 46 from measurement engine 40 at its inputs. As in the case of measurement engine 40, position engine 42 may be realized as customized hardware or logic, or as programmable logic executing computer program instructions stored in program memory 25p (FIG. 2) or elsewhere, or some combination thereof, for carrying out the computations and processing of the contents of signal groups 46 from measurement engine 40 in the manner described in this specification. In the embodiment of the invention illustrated in FIG. 3, position engine 42 is operable to receive pseudorange and delta range measurements, and measurement noise variances of these pseudorange and delta range measurements, for each satellite on an individual basis, and to compute one or both of the position and velocity of navigation system 20, and uncertainty metrics for either or both of those position and velocity determinations. In some embodiments of this invention, position engine 42 may optionally provide measurement engine 40 with feedback, such as position bias signals $\{b_i\}$ indicative of a difference between measured and predicted positions of navigation system 20. Position engine 42 also provides inputs to inertial navigation system 44, to facilitate calibration of sensors in inertial measurement unit 30; in some cases, inertial navigation system 44 may provide inputs to position engine 42 for its calibration or for other purposes, as known in the art. The manner in which position engine 42 performs its operations, according to embodiments of this invention, will be described in further detail below. In any event, it is contemplated that those skilled in the art having reference to this specification will be readily able to realize position engine 42 in a manner suitable for carrying out the descried operations for their particular applications, without undue experimentation.

In the overall architecture of navigation system 20 shown in FIG. 3, the position and velocity determinations generated by position engine 42, and the corresponding uncertainty metrics for those measurements, are forwarded to blending EKF 45 for combination with position (and optionally velocity) measurements based on the inertial transducer measurements described above. It is contemplated that, according to embodiments of this invention, the uncertainty metrics for position and velocity generated by GPS receiver 33 will assist in properly blending the measurements, for example by weighting the GPS position and velocity determinations according to the detected uncertainty level in those determinations. Blending EKF 45 produces the resulting integrated position and velocity results on line POS_INT, for forwarding to other functions within applications processor 22 or elsewhere in navigation system 20.

This combination of the GPS and inertial position and velocity determinations is provided by way of example only. It is contemplated that navigation system 20 or such other navigation system incorporating embodiments of this invention may rely solely on GPS navigation for its position and velocity determinations, and as such inertial measurement unit 30 and inertial navigation system 44 are entirely optional insofar as this invention is concerned. In such a case, the uncertainty metrics for GPS position and velocity are still useful, for example to advise the user of the accuracy of the GPS results. However, it is contemplated that the uncertainty metrics for GPS position and velocity as derived according to embodiments of this invention are especially useful in the blended application shown in FIG. 3.

The functional architecture of measurement engine 40 according to embodiments of this invention will now be described in connection with the generalized block diagram of FIG. 4a. For purposes of this description, it will be assumed that GPS receiver 33 also includes the appropriate functionality (not shown) for acquiring the incoming satellite signals; as such, the description of the operation of measurement engine 40 will be based on that assumption. The received satellite signals, after processing and filtering by AFE 38, are applied to inputs of multiple digital measurement engine channels 65, which are arranged in parallel. Each digital measurement engine channel 65 is associated with one of the k satellite signals and, among other functions, will strip the satellite-specific spreading code from the combined signal stream to recover its corresponding satellite signal contents and convert those contents to baseband.

Figure 4A:
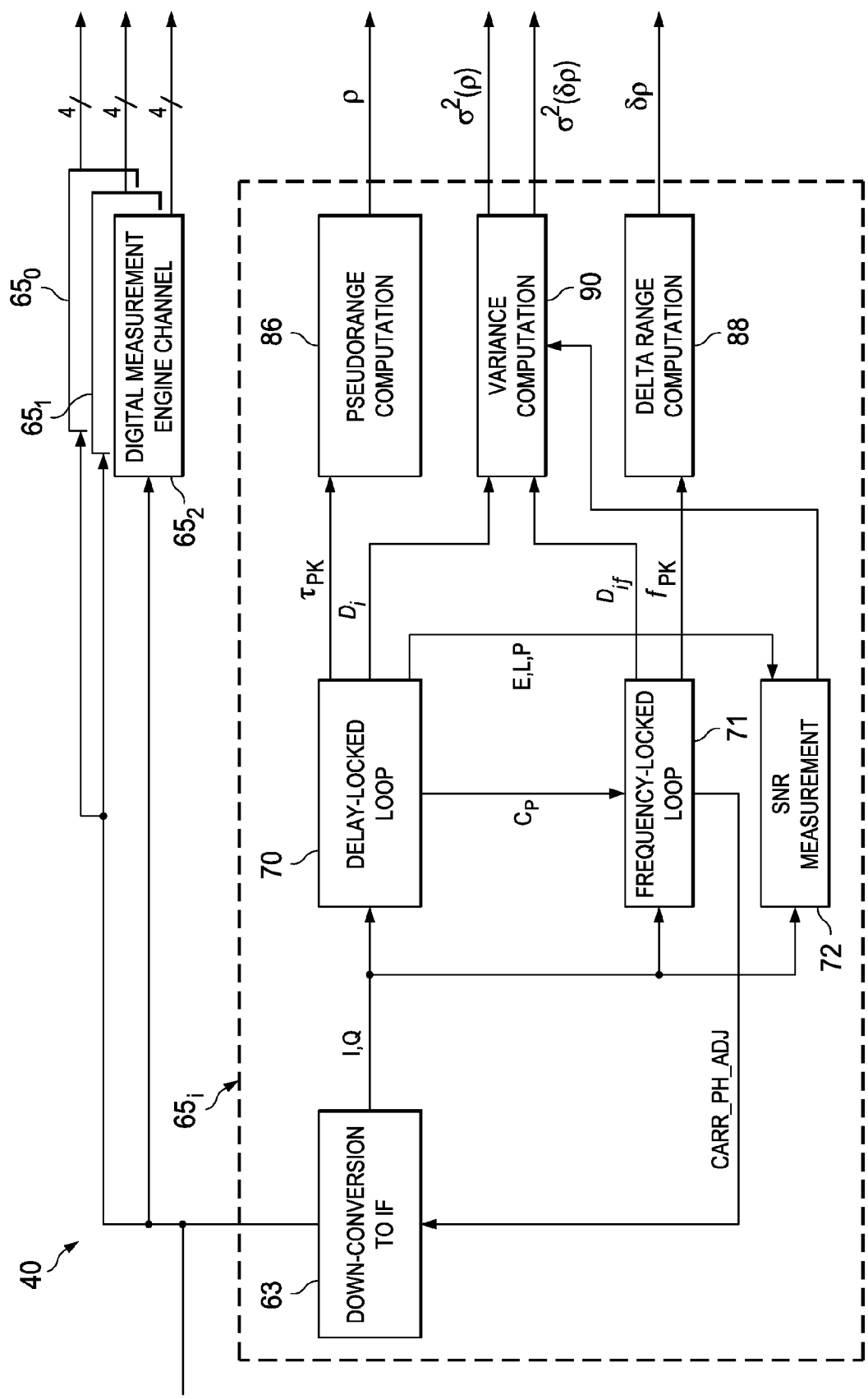
FIGS. 4a through 4c are electrical diagrams, in block form, of a measurement engine and a channel within the measurement engine, in the system of FIG. 3 according to embodiments of this invention.

The generalized functional construction of one of digital measurement engine channels 65, is also illustrated in FIG. 4a. It is to be understood that the other digital measurement engine channels 65 within measurement engine 40 will be similarly arranged. The construction illustrated in FIG. 4a is a functional architecture. As such, each digital measurement engine channel 65 may be physically constructed as custom logic circuitry within an integrated circuit, or as programmable logic (e.g., programmable general purpose logic such as a microprocessor, application-specific programmable logic such as a digital signal processor, etc.) executing program instructions stored in program memory, or as a combination of the two approaches (i.e., some portions realized in dedicated logic circuitry and other portions as program instructions executable by programmable logic circuitry). It is contemplated that those skilled in the art can readily realize the functions of these multiple digital measurement engine channels 65 in a manner best-suited for a particular application. Alternatively, it is contemplated that a single digital measurement engine channel 65 could be provided, with that single channel 65 sequentially processing the received satellite signals from each of multiple satellites; the following description will refer to the case in which multiple digital measurement engine channels 65 are used, by way of example.

Digital measurement engine channel 65, receives the incoming satellite signals at its downconverter 63 of measurement engine 40, which down-converts the frequencies of these signals to an intermediate frequency (i.e., at an IF below the received RF frequency, but still above baseband), with separate in-phase and quadrature-phase components resulting from the IF demodulation. Each digital measurement engine channel $65_i$ includes its own IF downconverter 63, because the signals received from each satellite can exhibit very different Doppler frequencies. Each digital measurement engine channel $65_i$ operates on the IF signal from its downconverter 63 to produce a pseudorange signal ρ, delta range signal δρ, pseudorange variance signal $\sigma^2(\rho)$, and delta range variance signal $\sigma^2(\delta\rho)$, based on that signal from satellite i. Digital measurement engine channel $65_i$ includes pseudorange computation function 86, delta range computation function 88, and variance computation function 90, each of which compute components of the signals output by digital measurement engine channel $65_i$; alternatively, multiple instances of measurement engine channel 65, may share pseudorange computation function 86, delta range computation function 88, and variance computation function 90, depending on the architecture of measurement engine 40.

In the arrangement shown in FIG. 4a, digital measurement engine channel 65, includes delay-locked loop 70, which receives the IF in-phase and quadrature-phase data streams I,Q, and demodulate these data to baseband by way of orthogonal pseudo-noise (PN) spreading codes, and from the demodulated data determine a correlation peak time $\tau_{PK}$ indicative of the time-of-arrival of the satellite signal, from which pseudorange computation function 86 determines pseudorange signal ρ for satellite i. Similarly, in this arrangement, frequency-locked loop 71 determines a Doppler phase shift measurement $f_{PK}$ from IF signal I,Q, from which delta range computation function 88 determines delta range signal δρ for satellite i. Frequency-locked loop 71 also produces a feedback signal on line CARR_PH_ADJ to IF downconverter 63, by way of which the carrier phase used in the IF down-conversion can be incremented in response to sensed Doppler frequency shifts.

In a general sense, digital measurement engine channel $65_i$ performs a correlation between the received satellite signal and the known spreading code for that signal, according to both a code-phase hypothesis and also a carrier-phase hypothesis. In the arrangement of FIG. 4a, delay-locked loop 70 determines a correlation value using the code-phase hypothesis of an estimated phase relationship between the known spreading code and the received signal; by way of an feedback loop, this code-phase hypothesis is adjusted according to the correlation result, to minimize an error value between the code-phase estimate of the hypothesis and the code-phase that produces the maximum correlation. That code-phase of the correlation peak indicates the time of receipt of the satellite signal at navigation system 20, from which the user position can be determined. Similarly, frequency-locked loop 71 determines a correlation using the carrier-phase hypothesis of an estimate of the carrier frequency (or phase) of the received satellite signal (the received signal possibly including Doppler shift due to motion of navigation system 20 relative to the satellite), as applied by downconverter 63. Feedback generated by frequency-locked loop 71 adjusts the carrier frequency estimate based on the correlation, to minimize an error value between the measured correlation and a correlation peak frequency; the correlation peak frequency is indicative of the instantaneous frequency of the received satellite, from which the user velocity can be determined.

According to some embodiments of this invention, digital measurement engine channel $65_i$ also includes variance computation function 90, which calculates pseudorange variance signal $\sigma^2(\rho)$, and delta range variance signal $\sigma^2(\delta\rho)$ accordingly, for the signal received from satellite i. In some embodiments of this invention, variance computation function 90 determines these variances from a measure of the signal-to-noise ratio (or carrier-to-noise ratio, or some other noise measurement), as performed by SNR measurement function 72. For example, SNR measurement function 72 can determine the signal-to-noise ratio (or carrier-to-noise ratio) in the conventional manner from the inputs and outputs of the discriminator functions within delay-locked loop 70 and frequency-locked loop 71. In other embodiments of the invention, variance computation function 90 bases those variances on discriminator outputs $D_i$, $D_{i,f}$ from delay-locked loop 70 and frequency-locked loop 71, respectively. In any event, these output signals representing pseudorange ρ, delta range δρ, pseudorange variance $\sigma^2(\rho)$, and delta range variance $\sigma^2(\delta\rho)$ are forwarded on to position engine 42, as described above.

Figure 4B:
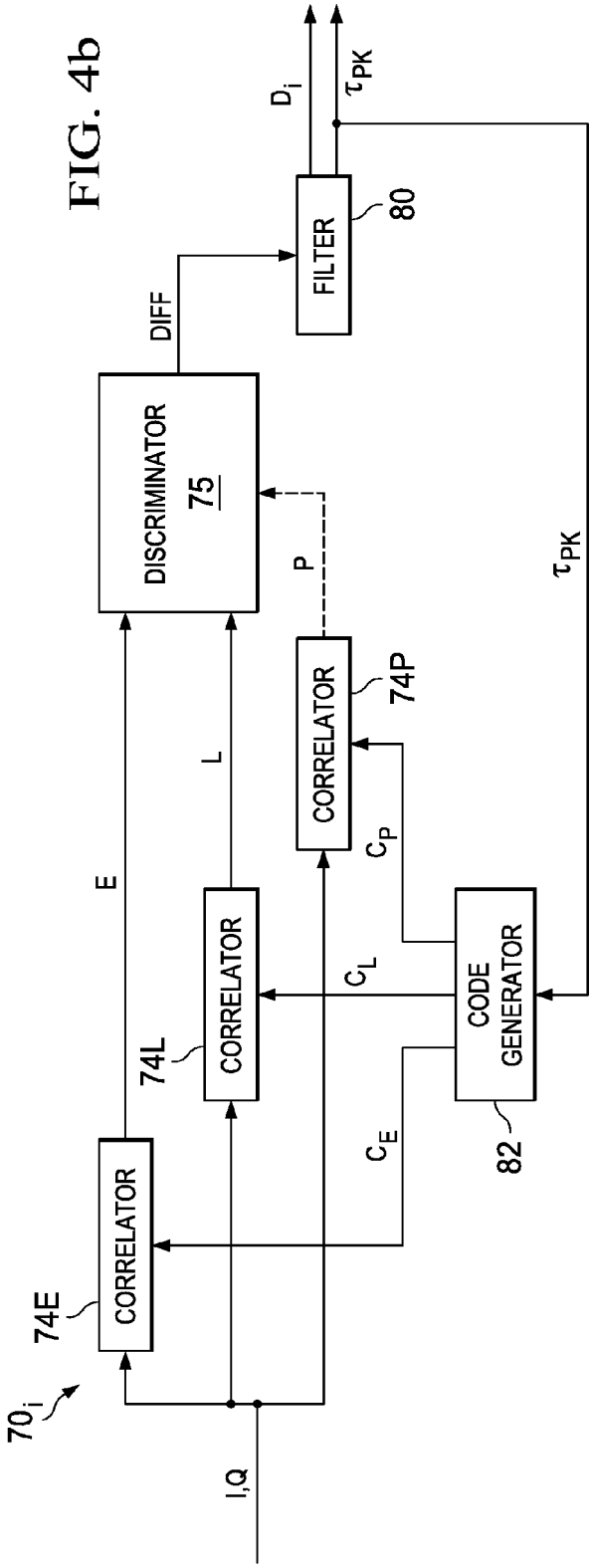

FIG. 4b illustrates the generalized construction of an example of delay-locked loop $70_i$, within representative digital measurement engine channel $65_i$ for the single "channel" associated with the signal from satellite i; additional channels are provided for signals from others of the k satellites, as discussed above. In-phase and quadrature signals I, Q produced by IF downconverter 63 are applied to inputs of correlators 74E, 74L, 74P, which correlate signals I,Q with a replica of the spreading code at baseband, as generated by code generator 82. Correlators 74E, 74L, 74P correlate the incoming signal with respective spreading code replicas $C_E$, $C_L$, $C_P$, which are at different delay times relative to one another. Prompt correlator 74P applies the replica code at a delay time (or phase) that corresponds to a recent prediction of the correlation time $\tau_{PK}$ at which the correlation result R(τ) is a maximum, for example as predicted by a prior iteration. That predicted correlation time $\tau_{PK}$ corresponds to the predicted time of arrival of the satellite signal. "Early" correlator 74E applies the spreading code replica at a delay time that is in advance of the predicted peak correlation time (e.g., time $\tau_{PK}$–d/2, or ½ "chip" early), while "late" correlator 74L applies the spreading code replica at a delay time after the predicted peak correlation time (e.g., time $\tau_{PK}$+d/2). Correlators 74E, 74L, 74P generate correlation results E, L, P, respectively, which correspond to the correlation between the replica code and the early, late, and prompt replica code versions $C_E$, $C_L$, $C_P$, respectively. These correlation results are forwarded to discriminator function 75.

As known in the art, multiple correlation results at different delay times are useful in improving the accuracy of the estimate the time of arrival of the satellite signal, particularly in providing feedback control of the delay times of the correlations. In this example, discriminator function 75 receives these multiple correlation results, and from these results effectively determines an error between the correlation peak as measured by those results, and a predicted correlation peak, for example as based on prior correlations in earlier time intervals. In this example, discriminator function 75 has inputs receiving early and late correlation results E, L from correlators 74E, 74L, respectively (and, optionally, result P from correlator 74P), upon which its error measurement is determined and presented at its output DIFF. Time-alignment of the replica code applied in correlation can then be adjusted in response to that error, so that the measured correlation peak tracks the actual peak time, allowing accurate derivation of the time of receipt of the satellite signal, and thus accuracy in the measured pseudorange ρ for that signal.

In the arrangement of FIG. 4b, filter function 80 receives output DIFF from discriminator 75, and generates filter output $D_i$ for application to variance computation function 90. Filter function 80, or alternatively some other function within delay-locked loop $70_i$, also produces a signal $\tau_{PK}$ that indicates the current estimate of the location of the correlation peak, which approximates the time-of-arrival of the satellite signal. Code generator 82 produces replica code versions $C_E$, $C_L$, $C_P$ for application to correlators 74E, 74L, 74P, at delay times adjusted in response to current correlation peak estimate signal $\tau_{PK}$. As mentioned above, this feedback control allows these correlations to lock onto and track the time of arrival.

Other approaches or modifications to determining the time of arrival can alternatively be used within digital measurement engine channel $65_i$, in embodiments of this invention. For example, the correlation results can be obtained by coherently adding multiple correlations within the time interval, effectively correlating to a longer PN sequence consisting of concatenated copies of the actual PN sequence. Non-coherent combining of correlations may also be used, to improve the SNR, in the conventional manner.

Figure 5A:
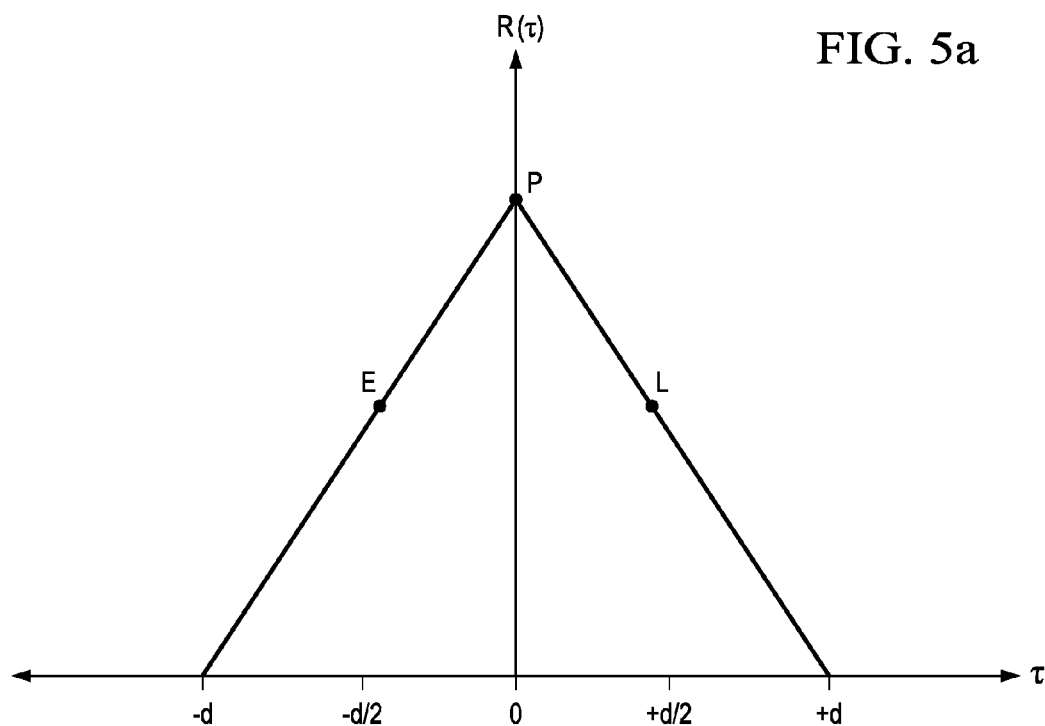
FIGS. 5a through 5e are plots illustrating correlation plots of received satellite signals and various error-inducing effects in those correlation plots.

In the operation of the discriminator-based arrangement of FIG. 4b, the correlation used in determining the time of arrival is generally based on the power of the product of the received signal with the replica signal (i.e., spreading code), at varying delay times τ of the replica signal. FIG. 5a illustrates an example of the correlation characteristic R(τ) over correlation delay time τ in an ideal case, in which the maximum correlation value R(τ) appears at correlation delay time τ=0 (i.e., $\tau_{PK}$=0). The peak correlation time provides a best estimate of the time of arrival of the signal. The values of the correlation characteristic R(τ) at early delay times (τ<0) and late delay times (τ>0) are below the peak value at the "prompt" delay time τ=0 in this ideal case. Because of the ideal alignment as shown in FIG. 5a, the early correlation value E=R(τ=−d/2) and the late correlation value L=R(τ=+d/2) equal one another.

Figure 5B:
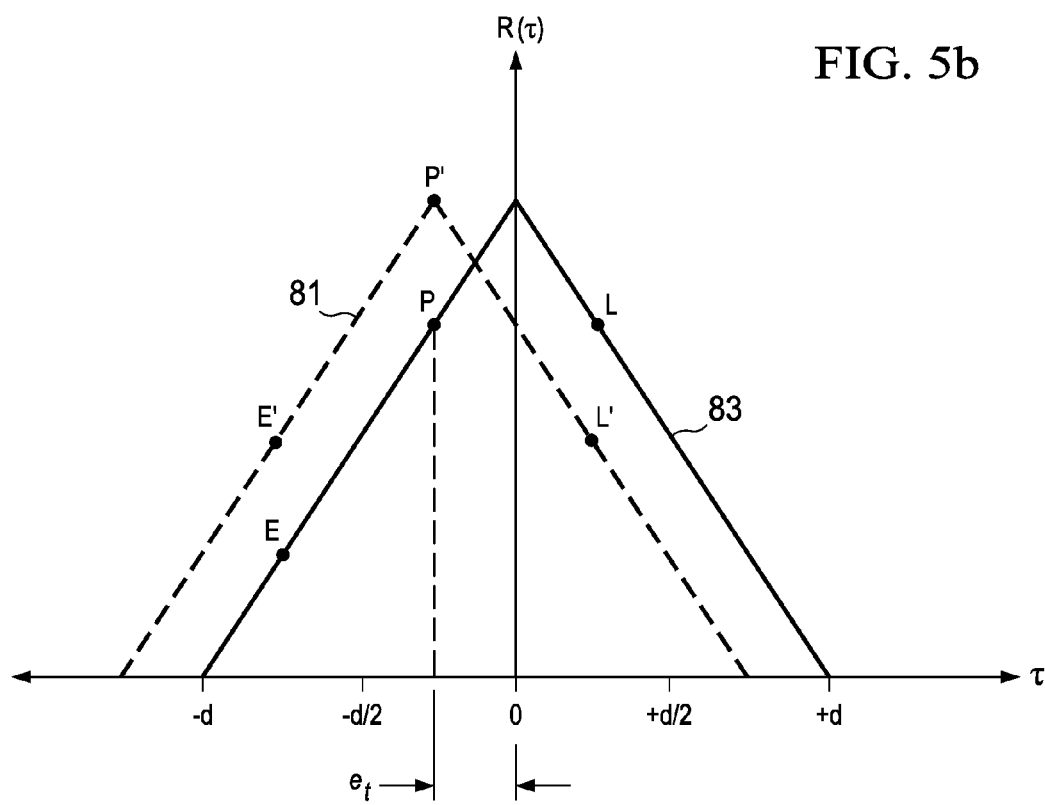

As mentioned above, discriminator-based delay-locked loop 70 adjusts the code phase at code generator 82 in response to the feedback of discriminator output $D_i$ to move its prompt correlation P to the actual peak correlation delay time. FIG. 5b illustrates an example of a non-ideal case in which the current estimate of the peak correlation time is in error, in this case earlier than the true correlation peak. In this example, correlation time error $e_t$ between the assumed prompt point P and the true correlation peak is about −d/4 (i.e., early by ¼ chip); delay-locked loop $70_i$ is thus operating under the erroneous assumption that the correlation characteristic is following plot 81 of FIG. 5b, while the actual correlation characteristic of the received signal follows plot 83. Because of the error in the current estimate, the prompt correlation value P=R(τ=−d/4) on plot 83 is significantly lower than that which would result if the current estimate were correct (i.e., at expected correlation value P' on curve 81). Discriminator function 75 thus has the task of shifting the delay times of replica code versions $C_E$, $C_L$, $C_P$ to properly align with the actual correlation characteristic of curve 83.

Discriminator function 75 in delay-locked loop 70, of FIG. 4b accomplishes this by deriving a measure of the error in correlation time, and applying that measure, via filter function 80, as feedback to code generator 82. Various discriminator techniques are known in the art, and may be used in discriminator function 75. In this example, discriminator function 75 compares the early and late correlation values E, L, respectively, to generate difference signal DIFF. In this example, difference signal DIFF corresponds to the late correlation value R(τ−d/2) subtracted from early correlation value R(τ−d/2), where τ is the current assumed correlation peak location. Filter function 80 smoothes variations in the difference signal DIFF over time in producing discriminator output $D_i$, and may use prompt correlation value P determined by prompt correlator 74P in that filtering. For example, filter function 80 may operate so that discriminator output $D_i$ averages:

$$D_i = \frac{E-L}{2P}$$

over time. According to this example, and in general, the feedback to code generator 82 in the form of discriminator output $D_i$ is proportional to the correlation time error $e_t$ (FIG. 5b), i.e., $D_i$=G*$e_t$, where G is the loop gain.

Referring back to FIG. 4a, frequency-locked loop 71 operates in a similar fashion as delay-locked loop 70 to synchronize the correlation of a replica code with changes in frequency, specifically to identify and track Doppler shifts in frequency caused by navigation system 20 moving at some velocity relative to the position of satellite i, and accounting for movement of the satellite itself. In the manner known in the art, frequency-locked loop 71 modulates correlator frequencies to maximize a correlation value R(f) as a function of frequency (or, in the instantaneous sense, phase). The frequency at which this correlation peak occurs can then be used by position engine 42 to determine a current user velocity. Those skilled in the art having reference to this specification will recognize that various approaches are available for realization of frequency-locked loop $71_i$, including by way of a phase-locked loop (PLL) approach rather than a frequency-locked loop (FLL).

Figure 4C:
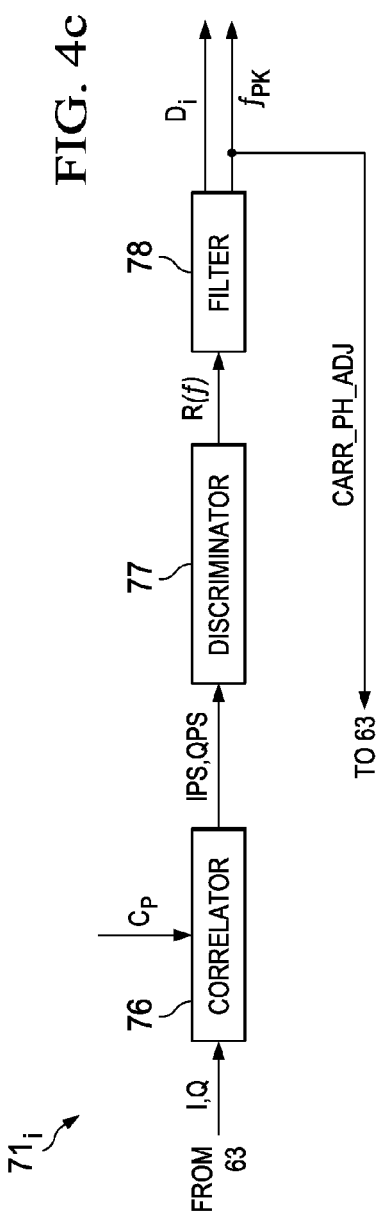

In summary, FIG. 4c illustrates a generalized construction of frequency-locked loop $71_i$, according to one conventional approach for this function. In this example, correlator 76 receives in-phase and quadrature phase components I,Q of the received satellite signal associated with digital measurement engine channel 65, from downconverter 63, along with prompt code version $C_P$ from code generator 82 in delay-locked loop $70_i$ (to eliminate the need for a redundant code generator in frequency-locked loop $71_i$). Alternatively, correlator(s) 76 may receive early and late code versions $C_E$, $C_L$ as inputs. In the example of FIG. 4c, correlator 76 performs a correlation of prompt code version $C_p$ with the downconverted received signal in the conventional manner, and produces in-phase and quadrature-phase correlation results IPS, QPS that are forwarded to discriminator function 77. Discriminator function 77 operates in the conventional manner to determine a correlation value R(f) based on the correlator results IPS, QPS. Alternatively, discriminator function 77 may receive one or more correlation results E, L, P from delay-locked loop $70_i$, so that its operation is based on correlation hypotheses determined by delay-locked loop $70_i$ rather than its own. Correlation value R(f) is filtered by filter function 78, in similar manner as filter function 80 in delay-locked loop 70$_i$, producing in this case frequency peak estimate $f_{PK}$ indicative of an estimate of the code frequency at which the peak correlation by correlator 76 is obtained. Filter 78 also produces discriminator output $D_{i,f}$ that is forwarded to variance computation function 90 (FIG. 4*a*). In this example, the frequency peak estimate $f_{PK}$ is feedback to downconverter 73 to adjust the carrier frequency it uses in downconversion, via signal CARR_PH_ADJ, and is also forwarded to delta range computation function 88 for use in determining a current delta range value δρ from satellite i, from which a velocity can be derived by position engine 42. As a result of this construction, frequency-locked loop 70$_i$ operates to adjust the carrier frequency in order to attain maximum correlation with the received satellite signal, to sense variations in the peak carrier frequency due to the Doppler effect, such variations indicative of the velocity and direction of navigation system 20.

As known in the art, navigation system 20 is sometimes in a location in which multipath signals from a given satellite i are received, often due to reflections from buildings or other manmade or natural structures. As fundamental in the art, these reflected versions of the satellite signal arrive at different times from the line-of-sight (LOS) signal; indeed, in some situations, navigation system 20 may not receive any LOS signal from a given satellite i, but may only receive reflected versions of the signal. These multipath reflections render quite difficult the determination of a time of arrival of the satellite signal, particularly by causing a "bias" error in the received signal and its correlation. More specifically, error in the calculated pseudorange ρ, in this multipath situation can be quite high, even if the signal-to-noise ratio of the satellite signal is itself very high.

Figure 5C:
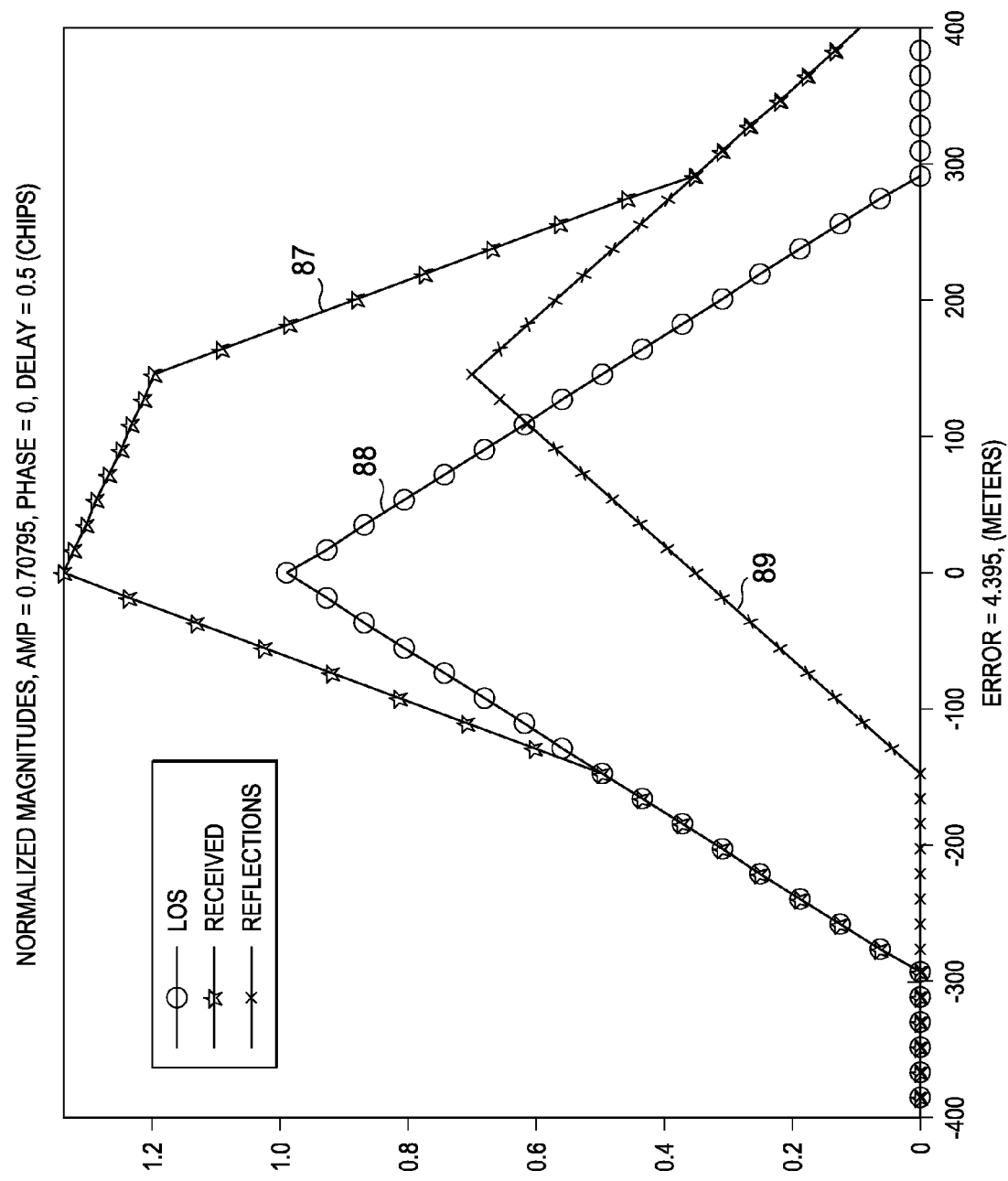

FIG. 5*c* illustrates an example of the multipath problem, in a situation in which both a line-of-sight (LOS) signal and a reflected version of the signal are received. Plot 87 represents the correlation value C(τ) of a received satellite signal including a line-of-sight signal and a single reflection. Plot 88 is the correlation plot that would result from the LOS signal alone, and plot 89 is the correlation plot that would result from the reflected signal alone. In this situation, one could express correlation value C(τ) as:

$$C(\tau) = R(\tau) + \alpha R(\tau + B)$$

where B is the bias, or delay of the reflected signal relative to the LOS signal, and where attenuation α is given by:

$$\alpha = m \cdot e^{j\theta}$$

θ being the phase shift of the reflection (which is 0° in this case). In general, correlation value C(τ) is time-varying because the parameters B, m, and θ are time-varying, particularly as navigation system 20 moves through the reflective environment. As evident from FIG. 5*c*, the reflected signal causes an error in the measured pseudorange.

Figure 5D:
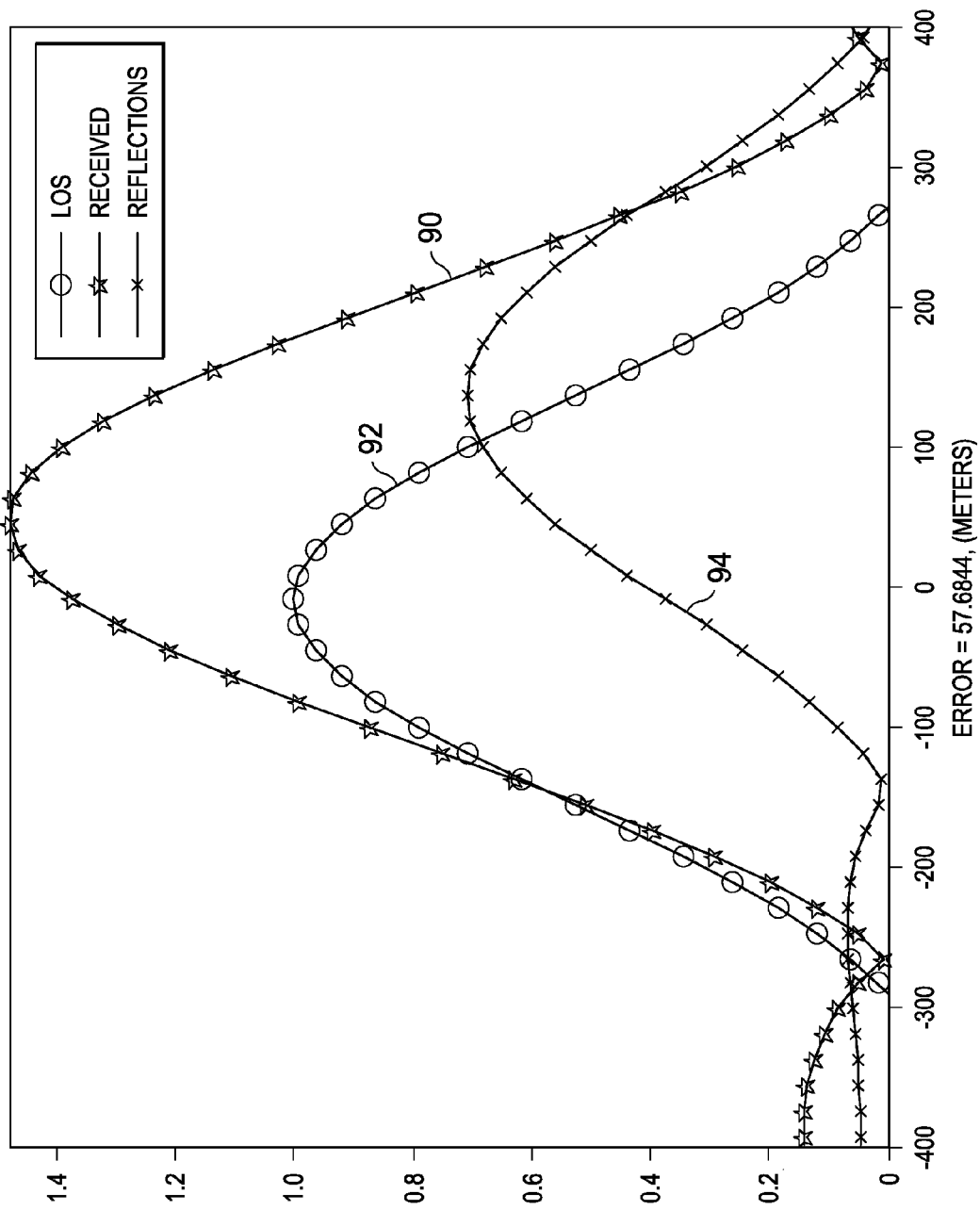

The correlations illustrated in FIG. 5*c* are somewhat idealized, as they assume infinite signal bandwidth. In practice, the signal bandwidth is limited, and as such the correlations are less sharp and can include additional correlation peaks. FIG. 5*d* illustrates correlation plot 90 for the received signal, based on the sum of an LOS signal (correlation plot 92) and reflected signals (correlation plot 94) under the same conditions (same values of parameters B, m, and θ) as in FIG. 5*c*, but with a more typical signal bandwidth as encountered in practice. This limited bandwidth causes a substantial increase in the pseudorange error, from about +4 meters to about +58 meters.

Figure 5E:
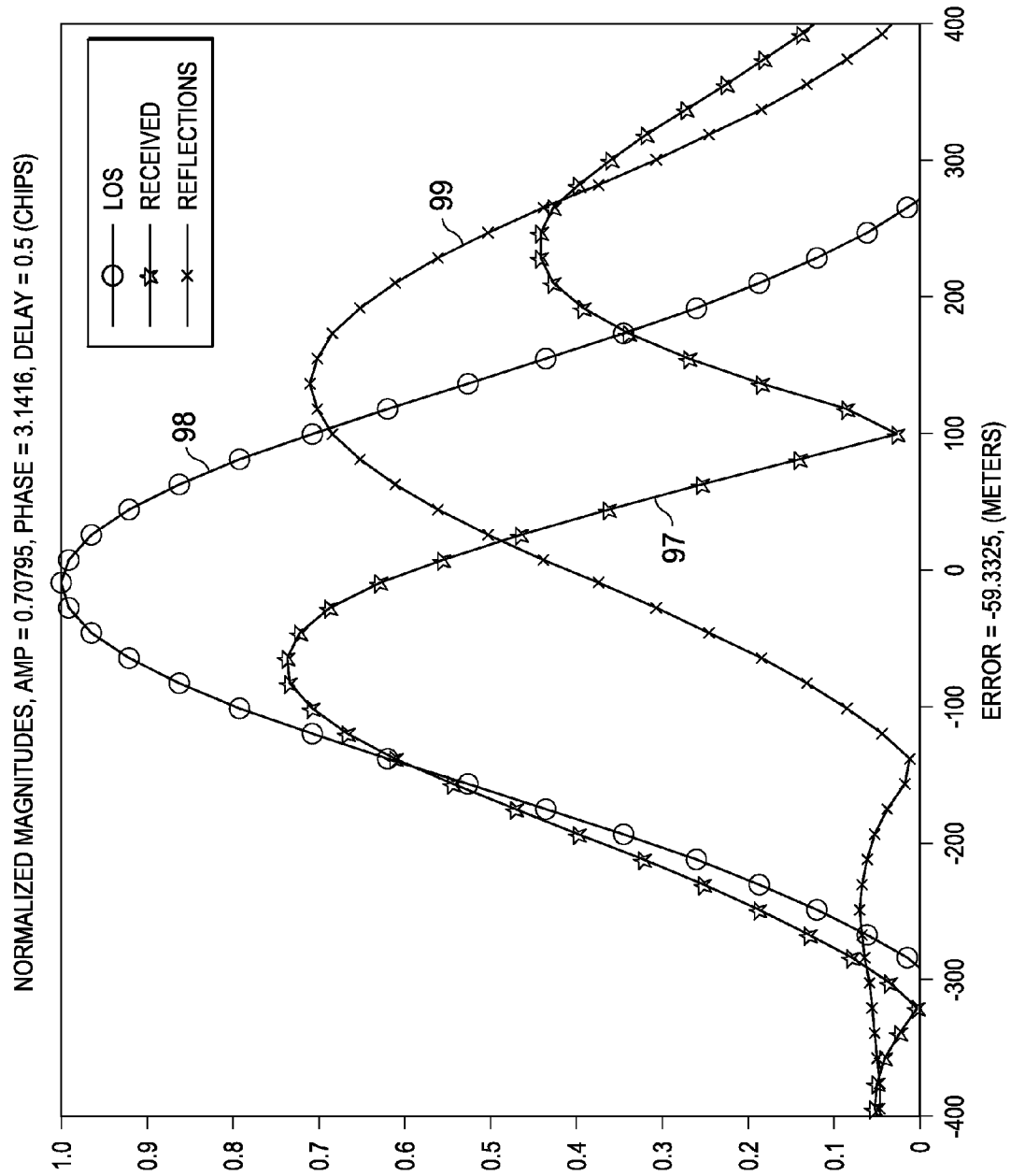

Phase modulation in the reflections of the signal is an additional source of error in the pseudorange measurement, as evident in the correlation plots of FIG. 5*e*. In this example, in which a phase shift of π is involved in the reflected signal, but with the same parameters B, m as in FIGS. 5*c* and 5*d*, two peaks become evident in the correlation plot 97 based on the received LOS signal (correlation plot 98) and reflections (correlation plot 99). With only the change in the phase shift between the situations of FIGS. 5*d* and 5*e*, the pseudorange error changes polarity and remains substantial (from about +58 meters to about −59 meters, in other words changing by about 117 meters).

Those skilled in the art having reference to this specification will thus realize that many possible causes for navigation error exist. High levels of noise in the received satellite signal of course reduce fidelity in the estimated pseudorange and delta range determinations. Even with good signal-to-noise ratios, however, multipath signals can cause substantial bias in the pseudorange and delta range measurements, as described above in connection with FIGS. 5*c* through 5*e*. As mentioned above, conventional approaches to GPS and GNSS navigation often include an uncertainty measurement that is based on the SNR of the received signals. However, it has been observed, in connection with this invention, that this method of determining uncertainty often provides poor results, especially in downtown urban areas in which the multipath situation is often present. Specifically, use of the SNR in the multipath context can be especially misleading, as a strong signal (high SNR) can still be heavily biased by reflections, as described above, and thus produce pseudorange and delta range measurements that are in fact quite uncertain.

Discriminator-Based Measurement Noise Variance Determination

Measurement engine 40 according to embodiments of this invention can more precisely determine measurement noise in the received GNSS signals. The operation and functionality of measurement engine 40, and specifically the operation of digital measurement engine channels 65 in measurement engine 40, according to embodiments of this invention, will now be described in detail with reference to the process flow diagram of FIG. 6. In process 50, measurement engine 40 receives digital data corresponding to signals received from multiple satellites, specifically those satellites from which navigation system 20 is receiving encoded GPS signals. For purposes of this description, each instance of process 50 involves the receipt of those encoded GPS satellite signals over a given time interval t. The duration of that time interval t varies with the particular GPS system, and can vary from as short as one millisecond to as long as one second or even longer.

Once the satellite signals are received for the current time interval t, processes 52 and 55 are performed to determine the pseudorange ρ, delta range δρ, pseudorange variance $\sigma^2(\rho)$, and delta range variance $\sigma^2(\delta\rho)$ for each of the k satellites. For purposes of this description, the measured pseudorange ρ and delta range δρ are determined by measurement engine 40 in process 52, while the pseudorange variance $\sigma^2(\rho)$ and delta range variance $\sigma^2(\delta\rho)$ corresponding to those measurements are determined in process 55, essentially simultaneously or in parallel with process 52. For purposes of this description, and consistent with the parallel arrangement of digital measurement engine channels 65 (FIG. 4), processes 52, 55 are contemplated to be performed for all of the k satellites simultaneously, and in parallel. Of course, if the architecture of measurement engine 40 may alternatively be arranged so that the pseudorange ρ, delta range δρ, pseudorange variance $\sigma^2(\rho)$, and delta range variance $\sigma^2(\delta\rho)$ are sequentially determined for each of the k satellites.

Referring first to process 52, each of digital measurement engine channels 65 in measurement engine 40 derives the measured pseudorange $\rho$ and delta range $\delta\rho$ for its associated satellites, from the signals received in process 50 over the current interval t. The particular method used by measurement engine 40 to carry out process 52 can be any one of the available pseudorange and delta range approaches known to those skilled in the art; the approach summarized above relative to FIGS. 4a and 4b including delay-locked loop 70 and frequency-locked loop 71, and the corresponding computation functions 86, 88, is useful in these embodiments of the invention. Process 52 thus yields a pseudorange $\rho$ value and a delta range $\delta\rho$ for value from for each of the k satellites from which navigation system 20 has received a signal.

In parallel (or sequentially, as the case may be), pseudorange $\rho$ and delta range $\delta\rho$ measurement noise variances are calculated in process 55 for each of the k satellites, by their respective digital measurement engine channels 65. For purposes of this description, the operation of variance calculation process 55 will be described with reference to one satellite signal (from satellite i), it being understood that the parallel digital measurement engine channels 65 will be operating simultaneously on the signals from their respective satellites to also determine the corresponding variances. Of course, the particular sequence in which the pseudorange $\rho$ and delta range $\delta\rho$ measurement variances are calculated for each of the k satellites can be arranged as best suited for a particular application, by those skilled in the art having reference to this description.

In a general sense, the result of variance calculation process 55, over the entire set of k satellites, represents the measurement variances for a vector of measurement noise v, in the form of a covariance matrix $\Sigma_v$. As described above, for the example of a least-squares solution of the pseudorange $\rho$ value, the position-domain error vector e caused by the measurement noise vector v in the pseudorange measurements, is expressed by:

$$e = H^+ v$$

The statistical characteristic of this position-domain error vector e is, as mentioned above, best represented by covariance matrix $\Sigma_e$. If the solution is obtained by way of a least-squares method, for a covariance matrix $\Sigma_v$ of measurement noise v, the position-domain error covariance matrix $\Sigma_e$ is given by:

$$\Sigma_e = H^+ \Sigma_v (H^+)^T$$

The use of a covariance matrix $\Sigma_v$ of measurement noise allows a generalized approach to determining position-domain uncertainty in the case in which measurement noise variances of the various satellite signals differ from one another. Conventional uncertainty determinations often express position-domain error covariance matrix $\Sigma_e$ based on the assumption that measurement noise v has equal variances over all satellites (i.e., $\Sigma_v = \sigma^2 I$), which results in the special case of the above equation:

$$\Sigma_e = (H^T H)^{-1} \sigma^2$$

According to embodiments of this invention, position-domain and velocity-domain uncertainties are computed separately for each satellite signal, and thus the assumption $\Sigma_v = \sigma^2 I$ is not applied. Rather, a measurement noise covariance matrix $\Sigma_v$ in which measurement noise variances $\sigma_i^2$ differ among the k satellites is used in the position and velocity determination. According to these embodiments of the invention, it is assumed that the elements of measurement noise vector v are statistically independent from one another, which renders a measurement noise covariance matrix $\Sigma_v$ in the form:

$$\Sigma_v = \text{diag}(\sigma_1^2, \sigma_2^2, \ldots, \sigma_n^2)$$

As will be described below, the individual satellite measurement noise variances $\sigma_i^2$ are to be determined.

Figure 6:
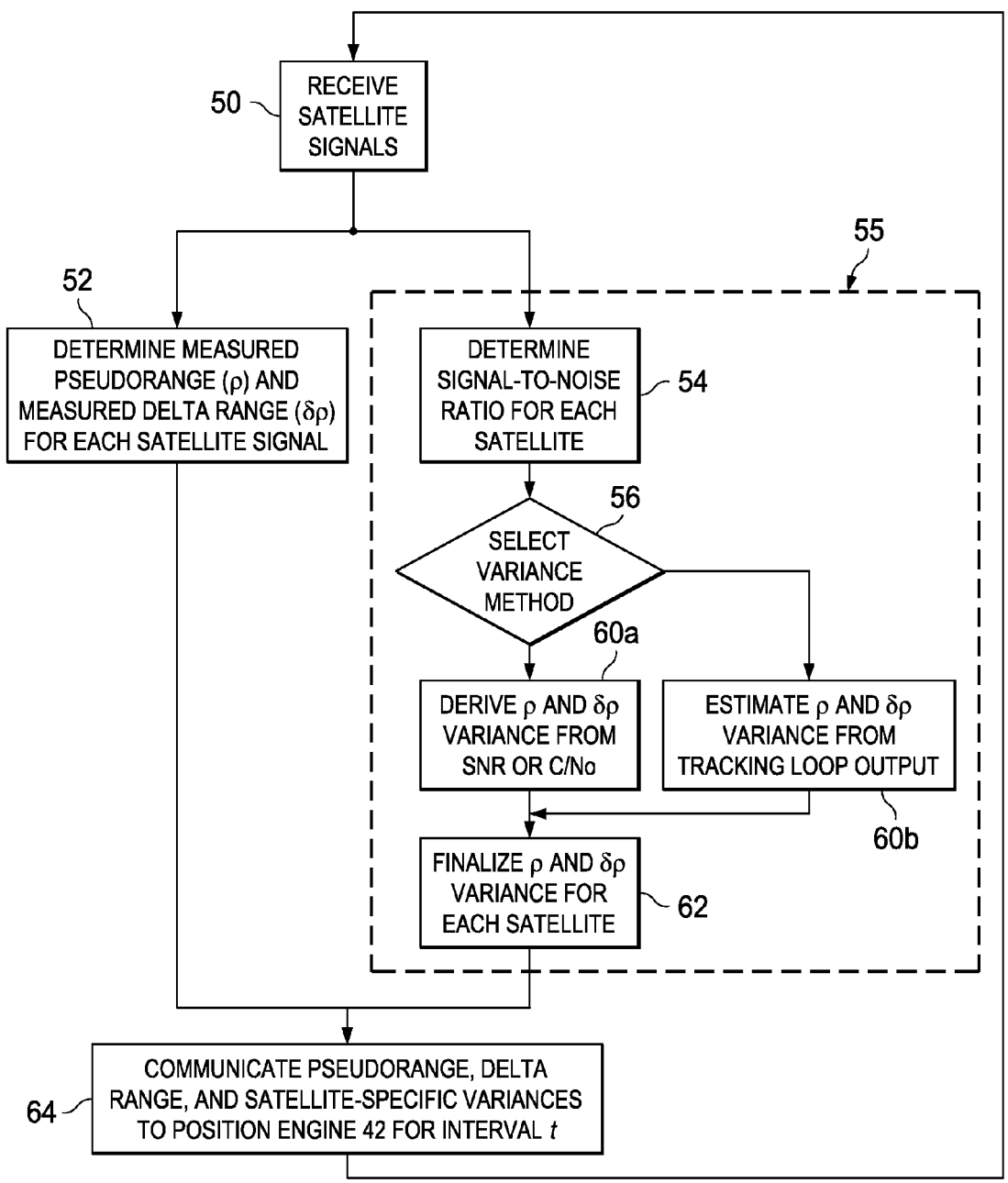
FIG. 6 is a flow diagram illustrating the operation of the measurement engine in the navigation system of FIG. 2 according to embodiments of this invention.

According to embodiments of this invention, multiple methods are available for estimation of these measurement noise variances $\sigma_i^2$. These methods are illustrated in FIG. 6 by processes 60a, 60b. Of course, more than two processes 60a, 60b may be made available, if desired. In the embodiment of the invention shown in FIG. 6, either or both of these available processes 60a, 60b are selected for use based on attributes of the received signal from satellite i. It has been observed that a reasonable metric for determining the best method or methods for measurement noise variance is one based on a signal-to-noise ratio of the received signal. As such, measurement variance calculation process 55 begins with process 54, in which a metric of the signal-to-noise ratio of the signal from one satellite (e.g., satellite i) is determined, for example by SNR measurement function 72 in measurement engine 40 (FIG. 4a). Conventional measurements and computations used in modern GNSS receivers to determine metrics of the signal-to-noise ratio (SNR) of the received signal, or of the carrier-to-noise ratio (C/No), are suitable for process 54. Decision 56 selects one or more of a set of available measurement noise variance processes 60a, 60b, based on the results from process 54 for satellite i. For example, process 60b may be suitable for satellite signals with a high SNR, while process 60a may be more suitable for satellite signals with a low SNR. Alternatively, both of processes 60a, 60b may be executed, with the highest variance value selected to provide a conservative result. It is contemplated that those skilled in the art having reference to this specification and its description of processes 60 herein, will be readily able to derive criteria for selecting one or more measurement noise variance processes 60 for use in connection with a received signal from satellite i, or for a particular receiver or application.

Measurement noise variance process 60a is a relatively simple approach to estimating measurement noise variance $\sigma_i^2$ for the received signal from satellite i. As mentioned above, process 60a may be well-suited for signals with low SNR or carrier-to-noise ratio; alternatively, process 60a may be used for all signals. According to process 60a, measurement noise variance $\sigma_i^2$ is based directly on the SNR or carrier-to-noise ratio (C/No) of the received signal, for example as determined by SNR measurement function 72 within digital measurement engine channel $65_i$ for the signal from satellite i. According to one approach, in which the bias in the pseudorange estimate is assumed to be zero, measurement noise variance $\sigma_i^2$ for satellite i is determined by variance calculation function 90 in process 60a, from the signal-to-noise ratio determined in process 54:

$$\sigma_i^2 = (\alpha \cdot 10^{-SNRi/20})^2$$

or, if carrier-to-noise ratio (C/No) is used:

$$\sigma_i^2 = (\alpha \cdot 10^{-(C/No)i/20})^2$$

where $\alpha$ is a tunable constant set to normalize the variances or based on another criterion for the application. If the zero bias assumption is not valid, an estimate $b_i$ of the DC bias in the measurement noise can be included in the measurement noise variance $\sigma_i^2$. For pseudorange measurement noise, for example, this bias can be estimated based on the pseudorange residual from a predicted user position (i.e., the difference between a measured pseudorange value and an otherwise-predicted pseudorange value); another approach to estimating the bias can be based on combining or filtering signals from other satellites, or as the residual determined from a previous position determination generated by position engine 42 (FIG. 3). Upon obtaining estimate $b_i$ of the pseudorange bias, this bias estimate $b_i$ can be included in the measurement noise variance $\sigma_i^2$ by:

$$\sigma_{i,adj}^2 = \sqrt{b_i^2 + \sigma_i^2}$$

or, alternatively, $$\sigma_{i,adj} = |b_i| + \sigma_i$$

These measurement noise variances $\sigma_i^2$ are generated in similar fashion, in process 60a, for both the pseudorange $\rho$ and delta range $\delta\rho$ measurements, and are communicated as pseudorange variance signal $\sigma^2(\rho_i)$ and delta range variance signal $\sigma^2(\delta\rho)$, which position engine 40 will arrange into entries of covariance matrices $\Sigma_{v,\rho}, \Sigma_{v,\delta\rho}$ corresponding to satellite i. In this approach, the discriminator error signals $D_i, D_{i,f}$ shown in FIG. 4a are not provided to variance computation function 90 by delay-locked loop 70 and frequency-locked loop 71, but rather are provided by SNR measurement function 72 for the associated satellite.

Process 60b estimates the measurement noise variance $\sigma_i^2$ for the received signal from satellite i utilizing the "tracking loop" function provided by delay-locked loop 70, and frequency-locked loop $71_i$, which operate as described above relative to FIGS. 4a and 4b. In this discriminator-based measurement noise variance process 60b, discriminator error signals $D_i, D_{i,f}$ for each satellite are used by variance computation function 90 to generate pseudorange variance signal $\sigma^2(\rho_i)$ and delta range variance signal $\sigma^2(\delta\rho)$ for each satellite. Direct use of the discriminator error signals $D_i, D_{i,f}$ for determining the variance signals $\sigma^2(\rho_i)$ and $\sigma^2(\delta\rho)$ is best suited for non-multipath signal receipt; in addition, the mean value of discriminator error signals $D_i, D_{i,f}$ is zero in steady-state if the tracking loop function is operating properly. In this case, the variances of discriminator error signals $D_i, D_{i,f}$ are used in producing the measurement noise variances $\sigma^2(\rho_i)$ and $\sigma^2(\delta\rho)$, respectively, as will be described in further detail below.

In the multipath situation, assuming proper operation of the tracking loops (e.g., delay-locked loop 70 for pseudorange measurement and frequency-locked loop 71 for delta range measurement), the correlation peak $C(\tau)$ of the composite signal will be continually tracked. But because this peak will have significant movement over time, as the multipath parameters B, m, and $\theta$ of the reflected signal change over time, the discriminator output values $D_i, D_{i,f}$ will exhibit a high variance as these multipath parameters change from time interval to time interval. For example, variation of only the parameter of phase shift $\theta$ between the plots of FIGS. 5d and 5e causes the correlation peak amplitude to range from 0.73 to 1.45 (about 6 dB), but causes the location of the correlation peak to range from −59.3 meters to +57.7 meters, assuming a constant true pseudorange. Use of the variance of the discriminator output to compute measurement noise will thus result in high values of measurement noise, and thus indicate high uncertainty in the pseudorange and delta range measurements, even if the actual measurements are in fact not that uncertain.

In this multipath situation, therefore, it is useful to also incorporate the multipath parameters B, m, and $\theta$ into the variance determination of process 60b, by determining the variation in correlation peak amplitude. One can use either the SNR or the discriminator error signal to detect the multipath parameter variations, whichever computation corresponds best to the rate of variation of the multipath parameter. Typically, the SNR is computed by SNR measurement function 72 over a certain signal duration, such as 200 msec or one second; the discriminator error used in its feedback control function is also averaged over a certain signal duration. It is useful to select either the SNR or the discriminator error as the appropriate parameter for estimating the variance of the change in peak amplitude, based on which value better gives visibility into the multipath variations.

In this multipath case, it is straightforward to determine a difference output signal (also referred to as $D_i$ and $D_{i,f}$ for pseudorange and delta range, respectively) as the difference between the current estimated value of the peak amplitude $P_i$ for a time interval and a mean peak amplitude value $\overline{P}$. The estimated value of peak amplitude $P_i$ can be determined in various ways, including simply using the most recent output P of prompt correlator 74P (or its equivalent in frequency-locked loop 71), and also including the output of SNR measurement function 72, either in the form of SNR or carrier-to-noise ratio over a set time duration. The variances of the peak amplitude from the mean in both the time and frequency domains will be used to generate the corresponding measurement noise variances $\sigma^2(\rho_i)$ and $\sigma^2(\delta\rho)$, as will be described below.

In any event, variance computation function 90 completes process 60b by calculating variance signals $\sigma^2(\rho)$ and $\sigma^2(\delta\rho)$ by one of a number of available approaches, which are similar in each of the cases of the discriminator output or peak amplitude cases. In general, variance computation function 90 determines a sample variance $S_i$ for each satellite i, and then scales that sample variance $S_i$ into the appropriate units to arrive at the variance signals $\sigma^2(\rho_i)$ and $\sigma^2(\delta\rho)$.

In one approach, a sample variance S is statistically calculated from a number $N_F$ of samples of the error values over time. For example, sample variance $S_i$ of discriminator output values (or correlation peak differences) $D_i$ can be calculated as:

$$S_i = \frac{1}{N_F} \sum_{i=1}^{N_F} \left(\frac{D_i}{G}\right)^2$$

One could also calculate the sample variance $S_i$ based on the correlation peak amplitude (i.e., the value of $P(\tau)$ for each of $N_F$ samples, as in this case gain G is unity). Another approach to estimating sample variance $S_i$ is by way of an infinite impulse response (IIR) digital filter realized within variance computation function 90. For example, a first order IIR filter can essentially compute a moving average over a time period defined by the reciprocal of the filter bandwidth:

$$\tilde{S}_i = \left(\left|\frac{D_i}{G}\right| - \tilde{S}_{i-1}\right) \cdot K + \tilde{S}_{i-1}$$

where the coefficient K is selected to provide the desired filter bandwidth, and thus the desired duration of the moving average. This approximation of the variance may require a scale factor for accuracy; for example, a scale factor of 1.25 applied to the IIR sample variance $\tilde{S}_i$ is useful for Gaussian error distribution. Similar sample variance values can be determined for the delta range measurements, based on the discriminator outputs (or correlation peak differences) $D_{i,f}$ from frequency-locked loop 71.

Following this determination of sample variation $S_i$ according to the desired approach, conversion into the appropriate units (meters, for pseudorange variance signal $\sigma^2(\rho)$; meters/second, for delta range variance $\sigma^2(\delta\rho)$) completes process 60$b$ as performed by variance computation function 90. In the pseudorange domain, because discriminator output $D_i$ is typically in time units of "chips", pseudorange variance signal $\sigma^2(\rho)$ is based on measurement variance $\sigma_i^2$ as follows:

$$\sigma_i^2 = S \cdot \left(\frac{c}{1023000}\right)^2$$

where c is the speed of light (m/s) and for the case in which the pseudo-noise spreading code has 1023000 chips per second. For generating delta range variance signal $\sigma^2(\delta\rho)$ based on measurement variance $\sigma_i^2$ in the delta range domain, the discriminator output of frequency-locked loop 71 is in units of Hz, such that:

$$\sigma_i^2 = S \cdot \left(\frac{c}{L_1}\right)^2$$

where $L_1$ is the carrier frequency (Hz). Variance determination process 60$b$ according to this embodiment of the invention, in which variance in discriminator output (correlation error) is used as a measure of measurement noise variance, is then complete.

Referring back to FIG. 6, variance computation function 90 then finalizes the current values of the variance signals $\sigma^2(\rho)$ and $\sigma^2(\delta\rho)$ in process 62, if both approaches of processes 60$a$, 60$b$ were executed. For example, process 62 can select the higher-valued result from the two processes 60$a$, 60$b$ to select the more conservative value. Other approaches (average, weighted average, etc.) to finalizing these variance signals $\sigma^2(\rho)$ and $\sigma^2(\delta\rho)$ in process 62 are also contemplated.

In process 64, measurement engine 40 communicates the values of pseudorange $\rho$, delta range $\delta\rho$, pseudorange variance $\sigma^2(\rho)$, and delta range variance $\sigma^2(\delta\rho)$, for each of the k satellites, to position engine 42. These values are communicated in a manner consistent with the architecture of navigation system 20, for example by way of corresponding signal groups 46 as shown in FIG. 3. The measurement and variance process of FIG. 6 is then repeated, for the received satellite signals over a next time interval t, beginning again from process 50 as shown in FIG. 6. In this manner, the pseudorange and delta range values indicated by the received satellite signals, and their respective uncertainties for each satellite individually, are determined on a real-time basis, for example to reflect the movement of navigation system 20 within the coordinate system.

According to embodiments of this invention which base the determination of pseudorange and delta range measurement noise variances on the discriminator output signal in the tracking loop, position engine 42 can determine the current position or velocity, or both, of navigation system 20, and corresponding uncertainty measurements for position and velocity, according to any one of a number of approaches, including both conventional techniques and also in a manner corresponding to embodiments of this invention. As such, the following description of the operation of position engine 42 will summarize conventional least-squares approaches, as well as a time-filtered approach according to embodiments of this invention.

As will now be described in detail relative to FIGS. 7$a$ and 7$b$, position engine 42 uses the values of pseudorange $\rho$, delta range $\delta\rho$, pseudorange variance $\sigma^2(\rho)$, and delta range variance $\sigma^2(\delta\rho)$ to determine the current position and velocity of navigation system 20, as well as an overall uncertainty measurement for those position and velocity estimates.

Position engine 42 is contemplated to be realized as customized hardware or logic, or as programmable logic executing computer program instructions stored in program memory 25$p$ (FIG. 2) or elsewhere, or some combination thereof, for carrying out the computations and processing of the contents of signal groups 46 from measurement engine 40. More specifically, given the functions of position engine 42 described below, it is contemplated that position engine 42 will generally be realized by general purpose microprocessor logic or as application-specific processor (e.g., a digital signal processor core or device) executing program instructions stored in program memory 25$p$, or in program memory more locally deployed to position engine 42 within GPS receiver 33. It is therefore contemplated that those skilled in the art having reference to this specification will be readily able to realize position engine 42 from the functional and process-based description of its operation in connection with embodiments of this invention, which will now be provided in connection with FIGS. 7$a$ and 7$b$.

FIG. 7$a$ illustrates the operation of position engine 42 to determine the current position and velocity of navigation system 20, and uncertainties in those position and velocity determinations, by way of a weighted or unweighted least-squares solution process. In process 100, position engine 42 receives, from measurement engine 40, values of pseudorange $\rho$, delta range $\delta\rho$, pseudorange variance $\sigma^2(\rho)$, and delta range variance $\sigma^2(\delta\rho)$ for each of the k received satellite signals, for example by way of signal groups 46 (FIG. 3). These signal values typically correspond to the measurements based on satellite signals received over a particular time interval t, for example ranging from 200 msec to one second for consumer level navigation systems 20.

As shown in FIG. 7$a$, process 101 is executed by position engine 42 to determine the current position and velocity of navigation system 20, from the pseudorange values $\rho$ and the delta range values $\delta\rho$ from each of the k satellites received in process 100 for the current time interval. Process 101 can be performed in the conventional manner for least-squares navigation, with or without a weighting matrix, as described above in connection with the background of the invention and as known in the art. If a weighted least-squares ("WLS") approach is used, the weighting matrix W is typically constructed from the measurement noise variances $\sigma^2(\rho)$ and $\sigma^2(\delta\rho)$ generated by measurement engine 40. For example, this weighting matrix W may be constructed as the inverse of measurement noise covariance matrix $\Sigma_v$:

$$W = \Sigma_v^{-1}$$

Typically, least-squares solution process 101 involves the determination of a pseudoinverse of a linearized derivative matrix H in which the entries correspond to linearized derivatives of the x, y, z, t coordinate values represented by each pseudorange (or delta range) value, at a nearby predicted position or velocity based on previous measurements or on results from other navigation techniques (e.g., inertial, cellular signal triangulation, etc.). The result of the least-squares solution process 101 is then converted to a convenient form, for example a latitude ($\phi$) and longitude ($\lambda$) position on the surface of the earth, for terrestrial navigation or navigation at sea. Those skilled in the art having reference to this specification will comprehend the manner in which least-squares solution process 101 is carried out by position engine 42, and can readily implement such a process by way of conventional program instructions for the particular architecture of position engine 42, without undue experimentation.

Figure 7A:
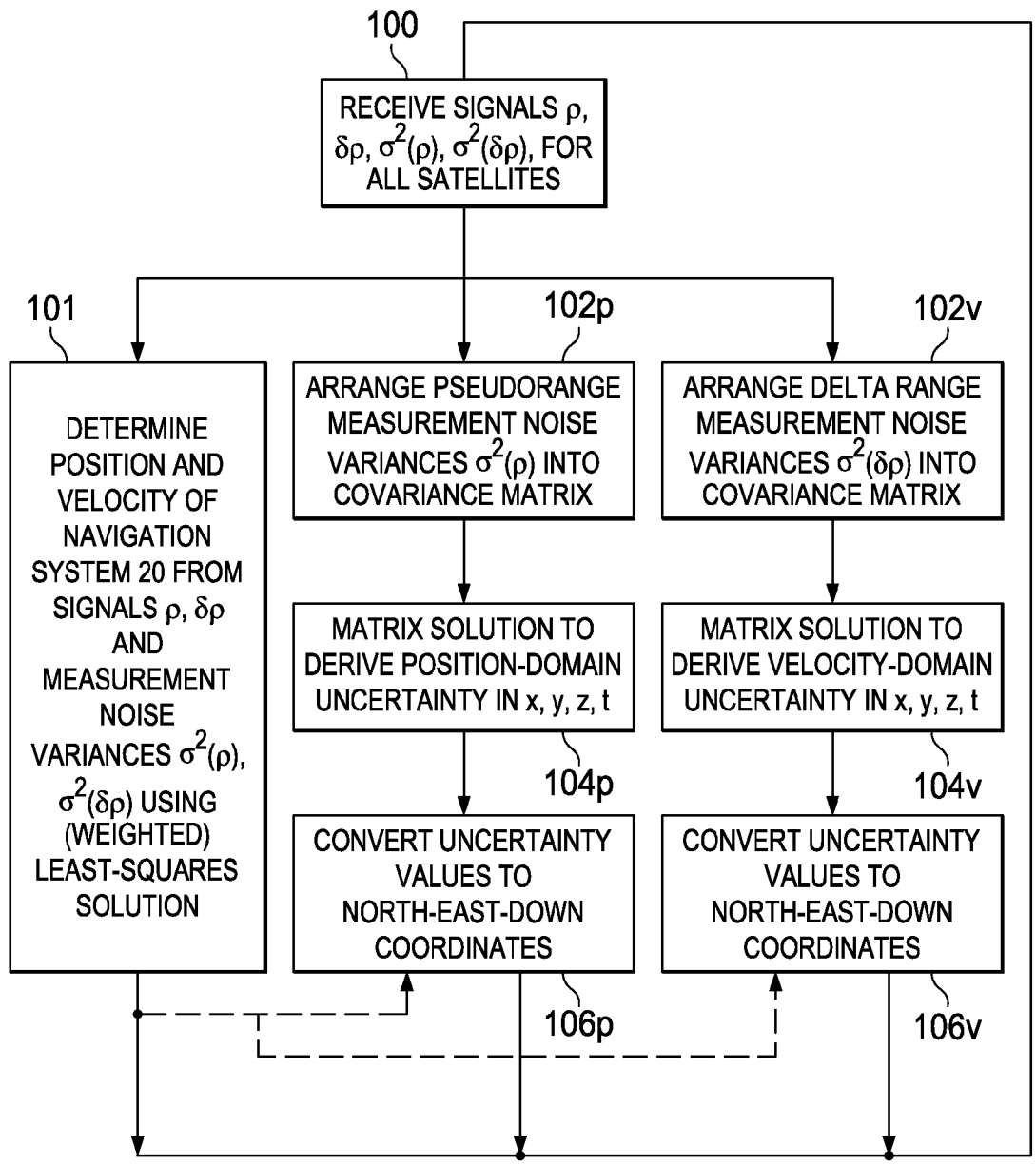
FIGS. 7a through 7c are flow diagrams illustrating the operation of a position engine in the navigation system of FIG. 2 according to embodiments of this invention.

In parallel with process 101, position engine 42 also determines uncertainty values for the position and velocity determinations made in process 101, according to embodiments of this invention as shown in FIG. 7a. Determination of the position uncertainty in connection with this least-squares approach begins with process 102p, in which the individual pseudorange measurement noise variance values $\sigma^2(\rho)$ from each of the k satellites are arranged into a measurement noise covariance matrix $\Sigma_{v,p}$ of the form:

$$\Sigma_{v,p} = \text{diag}(\sigma_1^2(\rho), \sigma_2^2(\rho), \ldots, \sigma_k^2(\rho))$$

where $\sigma_i^2(\rho)$ is the measurement noise variance determined by measurement engine 40 for the signal from satellite i according to the processes described above in connection with FIG. 6, according to embodiments of the invention.

Upon arranging covariance matrix $\Sigma_{v,p}$ for the position uncertainty in process 102p, position engine 42 then executes process 104p to determine the position-domain uncertainty value. According to this embodiment of the invention, process 104p solves the matrix equation:

$$\Sigma_{e,p} = H^+ \Sigma_{v,p} (H^+)^T$$

if process 101 for determining the current position estimate is carried out according to a conventional least-squares approach. The solution of this matrix equation is position-domain covariance matrix $\Sigma_{e,p}$, which as known in the art and as described above is a statistical representation of the position-domain error vector e caused by the measurement noise vector v. For a weighted least-squares approach used in process 101, in which inverse matrix $\Sigma_{v,p}^{-1}$ expresses the weight matrix (i.e., such that the position solution is weighted according to the measurement noise variances determined by measurement engine 40 according to this embodiment of the invention), the solution for the position-domain error covariance matrix $\Sigma_{e,p}$ is carried out in process 104p by way of:

$$\Sigma_{e,p} = (H^T \Sigma_{v,p}^{-1} H)^{-1}$$

It is contemplated that the matrix operations of process 104p according to this embodiment of the invention can be readily programmed or otherwise implemented within position engine 42 by those skilled in the art having reference to this specification, without undue experimentation.

According to this embodiment of the invention, the position-domain error covariance matrix $\Sigma_{e,p}$ may be determined by process 104p in the earth-centered, earth-fixed (ECEF) coordinate system, considering that satellite position is typically expressed according to this system. For most navigation purposes, it is more convenient to determine the uncertainty in the position measurement in the form of uncertainty values in the form of uncertainties along the north-south axis, the east-west axis, and the vertical axis (up-down), as well as an uncertainty value regarding the time offset. Accordingly, in this embodiment of the invention, process 106p is performed to convert the position-domain error covariance matrix $\Sigma_{e,p}$ from its ECEF frame of reference into the NED (north-east-down) frame of reference.

One approach to conversion process 106p follows the matrix equation:

$$\Sigma_{e,p,NED} = \begin{bmatrix} C_e^n & 0 \\ 0 & 1 \end{bmatrix} \Sigma_{e,p} \begin{bmatrix} (C_e^n)^T & 0 \\ 0 & 1 \end{bmatrix}$$

where $C_e^n$ is a 3×3 coordinate transformation matrix for transforming ECEF to the desired frame of reference. For the case of transforming ECEF to NED, as in this example, matrix $C_e^n$ is expressed as:

$$C_{e,3\times3}^n = \begin{bmatrix} -\sin(\phi)\cos(\lambda) & -\sin(\phi)\sin(\lambda) & \cos(\phi) \\ -\sin(\lambda) & \cos(\lambda) & 0 \\ -\cos(\phi)\cos(\lambda) & -\cos(\phi)\sin(\lambda) & -\sin(\phi) \end{bmatrix}$$

where $\phi$, $\lambda$ represent the latitude and longitude, respectively, of the position determined in process 101. The result $\Sigma_{e,p,NED}$ of this matrix evaluation is then converted by position engine 42 in process 106p into the final position-domain uncertainty metrics in the desired frame of reference. For example, if the position uncertainty metrics are to be determined in the NED frame of reference, converted covariance matrix $\Sigma_{e,p,NED}$ can be transformed in process 106p according to the following:

$$\sigma_N = \beta \sqrt{\Sigma_{e,p,NED}(1,1)}$$

$$\sigma_E = \beta \sqrt{\Sigma_{e,p,NED}(2,2)}$$

$$\sigma_D = \beta \sqrt{\Sigma_{e,p,NED}(3,3)}$$

$$\sigma_T = \beta \sqrt{\Sigma_{e,p,NED}(4,4)}/c$$

where the values $\sigma_N$, $\sigma_E$, $\sigma_D$, $\sigma_T$, are the position-domain uncertainty values in the north, east, down (vertical), and time dimensions, respectively. The scaling factor $\beta$ is set by the programmer for a realistic value, and the value $\Sigma_{e,p,NED}(i, i)$ refers to the $(i, i)^{th}$ entry of matrix $\Sigma_{e,p,NED}$. In addition, process 106p can produce position-domain uncertainty values in other frames of reference using the values $\sigma_N$, $\sigma_E$, $\sigma_D$, $\sigma_T$. For example, process 106p can generate a "geometric" uncertainty value $\sigma_G$ as:

$$\sigma_G = \sqrt{\sigma_N^2 + \sigma_E^2 + \sigma_D^2 + \sigma_T^2}$$

Process 106p can additionally or alternatively generate a "total position" uncertainty value $\sigma_P$ as:

$$\sigma_P = \sqrt{\sigma_N^2 + \sigma_E^2 + \sigma_D^2}$$

and additionally or alternatively generate a "horizontal" uncertainty value $\sigma_H$ as:

$$\sigma_H = \sqrt{\sigma_N^2 + \sigma_E^2}$$

Additional measures or metrics of uncertainty can also or alternatively be generated in process 106p by position engine 42.

Similar processes are executed by position engine 42 to generate uncertainty values based on the measurement noise variances $\sigma^2(\delta\rho)$ generated by measurement engine 40 relative to the delta range measurements for each received satellite signal. In this embodiment of the invention, processes 102v, 104v, 106v are executed by position engine 42 to operate on those delta range measurement noise variances $\sigma^2(\delta\rho)$ for the velocity domain in much the same manner as processes 102p, 104p, 106p operate in the position domain. As a result, processes 102v, 104v, 106v produce uncertainty values for the velocity of navigation system 20 determined in process 101, in the desired frame of reference (NED, etc.).

Following completion of processes 101, 106p, 106v, in either parallel or sequential fashion, position engine 42 has produced a position, a velocity, and uncertainty values for the position and velocity values, based on the GNSS satellite signals received over the current time interval t and using a least-squares (weighted according to measurement noise, if desired) approach. In the implementation of FIG. 3, these values are then forwarded to blending EKF function 45, or are alternatively used by navigation system 20 in the conventional manner. And these processes are then repeated for signals received over the next time interval, as shown in FIG. 7a.

Kalman-Filter-Based Determination of Position, Velocity, and Position and Velocity Uncertainties As described above in connection with the Background of the Invention, many modern GPS receivers use a Kalman filter to solve the systems of equations based on pseudorange and delta range measurements to determine position, velocity, and time offset ("PVT") of the navigation system. An example of the operation of the Kalman filter is described in Levy, "The Kalman Filter: Navigations Integration Workhorse", *GPS World*, Vol. 8, No. 9 (September, 1997) pp. 65-71, incorporated herein by reference. As described in that article and as known in the art, the Kalman filter uses prior estimates of position and velocity, and current measurements of pseudorange, delta range, and measurement noise to generate an updated estimate of position and velocity, and uncertainties in those measurements.

According to these embodiments of this invention, the pseudorange, delta range, pseudorange variances, and delta range variances may be determined by measurement engine 40 either as based on SNR or C/No ratios, or by way of using the tracking loop output as described above in connection with embodiments of this invention. Position engine 42 receives these measurements and measurement noise variances, on a satellite-by-satellite basis, from measurement engine 40. According to these embodiments of this invention, those measurements are applied to Kalman filter methods of solving the navigation equations for PVT, as will now be described in connection with FIG. 7b.

Figure 7B:
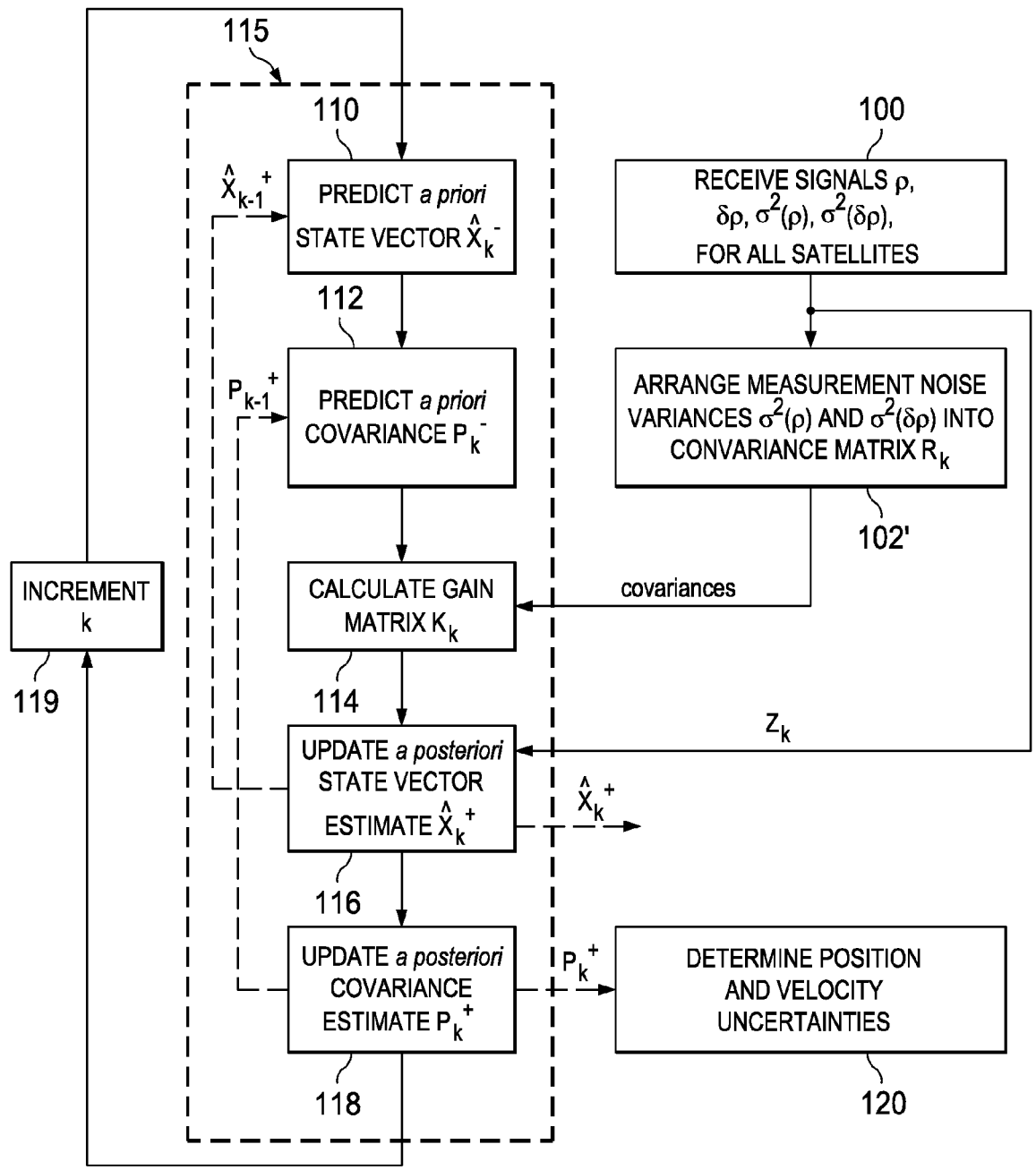

Kalman filter process 115 is illustrated in FIG. 7b, in the form of an iterative process in which particular operations are repeated for each time interval of interest, using the results from the previous time interval and also measurements and measurement noise variances acquired by measurement engine 40. Kalman filter process 115 for a current time interval begins with process 110, in which an a priori state vector estimate is predicted based on an a posteriori state vector estimate from the previous time interval. In embodiments of this invention, for the example of an 8-state EKF implementation, the state vector x corresponds to:

$$x = [x, y, z, -ct_u, \dot{x}, \dot{y}, \dot{z}, -c\dot{t}_u]^T$$

in which [x, y, z] and [$\dot{x}$, $\dot{y}$, $\dot{z}$] represent the current position and velocity, respectively, of navigation system 20, and where $t_u$ and $\dot{t}_u$ represent the clock bias and drift, respectively, of navigation system 20 (c being the speed of light). In process 110, as mentioned above, an a posteriori state vector estimate $\hat{x}_{k-1}^+$ is applied to a system equation:

$$x_k = A x_{k-1} + w_k$$

to derive the a priori state vector estimate $\hat{x}_k^-$ for the current time interval k iteration. In this system equation, vector $w_k$ represents a model of the process noise, as known in the art, and system matrix A is given by:

$$A = \begin{bmatrix} 1 & 0 & 0 & 0 & T & 0 & 0 & 0 \\ 0 & 1 & 0 & 0 & 0 & T & 0 & 0 \\ 0 & 0 & 1 & 0 & 0 & 0 & T & 0 \\ 0 & 0 & 0 & 1 & 0 & 0 & 0 & T \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

where T is the sample time period (i.e., time difference between the successive values of the state vectors $x_{k-1}$ and $x_k$). In this embodiment of the invention, the matrix operation:

$$\hat{x}_k^- = A \hat{x}_{k-1}^+$$

is carried out in process 110.

The a priori state vector estimate $\hat{x}_k^-$ from process 110 is then applied by position engine 42 to process 112, in which an a priori covariance matrix $P_k^-$ is evaluated from the a posteriori covariance estimate $P_{k-1}^+$ from the previous time interval, in combination with process noise vector $w_k$, which is assumed to be a Gaussian random vector with zero mean and covariance $Q_k$. Process noise vector $w_k$, and thus its covariance $Q_k$, are assumed to remain constant over time, as this noise refers to the system noise and precision of navigation system 20 itself. More specifically, process 112 is executed by position engine 42 to evaluate the matrix equation:

$$P_k^- = A P_{k-1}^+ A^T + Q_k$$

The measurement equation:

$$z_k = h_k(x_k) + v_k$$

defines the relationship among measurement vector $z_k$, which includes up to two measurements (either or both of pseudorange $\rho$ and delta range $\delta\rho$) for each satellite, the true state vector $x_k$, and measurement noise vector $v_k$, which is assumed to have zero mean and covariance $R_k$. According to embodiments of this invention involving execution according to a Kalman filter approach, this non-linear measurement equation is linearized about the current value of the state equation:

$$z_k = H_k x_k + v_k$$

An example of this linearization of the measurement equation, illustrating the arrangement of the specific entries and values for the case in which signals are received from four satellites, can be shown by:

$$\begin{bmatrix} \rho_1 \\ \rho_2 \\ \rho_3 \\ \rho_4 \\ \dot{\rho}_1 \\ \dot{\rho}_2 \\ \dot{\rho}_3 \\ \dot{\rho}_4 \end{bmatrix} = \begin{bmatrix} a_{x1} & a_{y1} & a_{z1} & 1 & 0 & 0 & 0 & 0 \\ a_{x2} & a_{y2} & a_{z2} & 1 & 0 & 0 & 0 & 0 \\ a_{x3} & a_{y3} & a_{z3} & 1 & 0 & 0 & 0 & 0 \\ a_{x4} & a_{y4} & a_{z4} & 1 & 0 & 0 & 0 & 0 \\ 0 & 0 & 0 & 0 & a_{x1} & a_{y1} & a_{z1} & 1 \\ 0 & 0 & 0 & 0 & a_{x2} & a_{y2} & a_{z2} & 1 \\ 0 & 0 & 0 & 0 & a_{x3} & a_{y3} & a_{z3} & 1 \\ 0 & 0 & 0 & 0 & a_{x4} & a_{y4} & a_{z4} & 1 \end{bmatrix} \begin{bmatrix} x \\ y \\ z \\ -ct_u \\ \dot{x} \\ \dot{y} \\ \dot{z} \\ -c\dot{t}_u \end{bmatrix} + \begin{bmatrix} v_x \\ v_y \\ v_z \\ v_{ct_u} \\ v_{\dot{x}} \\ v_{\dot{y}} \\ v_{\dot{z}} \\ v_{c\dot{t}_u} \end{bmatrix}$$

where $\rho_i$ and $\dot{\rho}_i$ are the pseudorange and the delta range measurements, respectively, for the satellite i, and $a_{xi}$, $a_{yi}$, $a_{zi}$ are the x, y, and z components, respectively, of the unit norm vector pointing from the position of navigation system 20 to that satellite i. It is this linearized measurement equation that is evaluated by position engine 42 by its executing of processes 114, 116, as will now be described.

In practice, any number of measurements from any number of satellites may be relevant to the current navigation process. In some cases, no measurements may be available over a time interval; in those cases, the predicted state vector from the corresponding time interval will simply be the propagation of the result from the previous time interval. In other cases, some satellites may not provide new measurements in that time interval, or measurement engine 40 may discard some measurements, for example if the signal-to-noise ratio for a particular satellite's measurements is too low. It is contemplated that the process of FIG. 7b according to embodiments of this invention will be capable of managing the updated state vector prediction in such cases, again by perhaps propagating the previous measurements and variances from the previous interval.

In process 114, position engine 42 uses the a priori covariance matrix $P_k^-$ from process 112, along with measurement noise variances from measurement engine 40, to arrive at a gain matrix $K_k$. As shown in FIG. 7b, the current variances are obtained by position engine 42 in process 100, by receiving values of pseudorange $\rho$, delta range $\delta\rho$, pseudorange variance $\sigma^2(\rho)$, and delta range variance $\sigma^2(\delta\rho)$ from measurement engine 40, for each of the k received satellite signals over a particular time interval t, for example by way of signal groups 46 (FIG. 3). In process 102', similarly as described above in processes 102p, 102v shown in FIG. 7a, the individual pseudorange measurement noise variance values $\sigma^2(\rho)$ and delta range measurement noise variance values $\sigma^2(\delta\rho)$ are arranged into a measurement noise covariance matrix, specifically covariance matrix $R_k$ for use in the measurement equation evaluation. The most recent position estimate defines measurement matrix $H_k$, which as described above is expressed in terms of direction cosines of the unit vector pointing from that position estimate to the satellite. As a result, process 114 evaluates gain matrix $K_k$ for this iteration as:

$$K_k = P_k^- H_k^T (H_k P_k^- H_k^T + R_k)^{-1}$$

And once this gain matrix $K_k$ is evaluated for this iteration k in process 114, then position engine 42 executes process 116 to produce an updated (i.e., a posteriori) state vector estimate $\hat{x}_k^+$ from:

$$\hat{x}_k^+ = \hat{x}_k^- + K_k[z_k - h_k(\hat{x}_k^-)]$$

where vector $z_k$ is the vector of current measurement values of pseudorange $\rho$ and delta range $\delta\rho$, as acquired in process 100. The values of this state vector estimate $\hat{x}_k^+$ generated in process 116, which as described above provides the current estimate of the position and velocity of navigation system 20, can be output by position engine 42 to blending EKF 45 (FIG. 3), or output elsewhere for purposes of the navigation being carried out by navigation system 20. Conversion of these values into the particular frame of reference (e.g., NED rather than ECEF), can be carried out in the manner described above relative to FIG. 7a.

In process 118, position engine generates an updated, or a posteriori, estimate of the covariance matrix $P_k^+$, according to embodiments of this invention. In a general sense, covariance matrix $P_k^+$ for the error in the a posteriori state vector estimate $\hat{x}_k^+$ is calculated in this Kalman filter process 115, and is defined as the matrix of expected value of the squares of the difference between the current estimate $\hat{x}_k^+$ and the true position $x_k$:

$$P_k^+ = E[(x_k - \hat{x}_k^+)(x_k - \hat{x}_k^+)^T]$$

According to embodiments of this invention, this updated, or a posteriori, estimate of the covariance matrix $P_k^+$ is based on the a priori estimate and gain matrix $K_k$ by position engine 42 executing process 118 to evaluate the matrix equation:

$$P_k^+ = (I - K_k H_k) P_k^-$$

This a posteriori estimate of the covariance matrix $P_k^+$ is thus essentially the filtered output of the process noise covariance $Q_k$ (as incorporated into the a priori estimate of covariance matrix $P_k^-$ in process 114) and the measurement noise covariance $R_k$ applied to the gain calculation of process 116). A posteriori covariance matrix estimate $P_k^+$ is then used in the prediction of the a priori covariance matrix $P_k^-$ in the next iteration of Kalman filter process 115 for the next time interval (i.e., after the incrementing of index k performed in process 119).

The uncertainties in position, velocity, time, and time drift expressed in a posteriori covariance matrix estimate $P_k^+$ for the current time interval are output by position engine 42 via process 120. According to this embodiment of the invention, submatrices of a posteriori covariance matrix estimate $P_k^+$ constitute the position-domain and velocity-domain uncertainties. More specifically, in this embodiment of the invention, position uncertainty matrix $P_{k,pos}^+$ is expressed in the submatrix:

$$P_{k,pos}^+ = P_k^+(1:4, 1:4)$$

which in other words amounts to the submatrix of the entries in the first four rows and first four columns of a posteriori covariance matrix estimate $P_k^+$. Similarly, velocity uncertainty matrix $P_{k,vel}^+$ is expressed in the submatrix:

$$P_{k,vel}^+ = P_k^+(5:8, 5:8)$$

namely, the submatrix of the entries in the fifth through eighth rows and fifth through eighth columns of a posteriori covariance matrix estimate $P_k^+$. The values along the diagonals of velocity uncertainty matrices $P_{k,pos}^+$, $P_{k,vel}^+$ return the uncertainty values for each of the x, y, z, and t dimensions in the ECEF frame of reference. Process 120 also includes the necessary operations, carried out by position engine 42, to convert these uncertainties from the ECEF frame of reference to one or more other desired frames of reference, such as NED, as described above relative to processes 106p, 106v of FIG. 7a.

It has been observed, in connection with this invention, that in some instances the process noise variances or even the measurement noise variances used by position engine 42 to derive the position and velocity uncertainties can be somewhat unrealistic, which of course results in unrealistic position and velocity uncertainties. One such instance occurs in the case in which low quality measurements are provided by measurement engine 40, requiring the Kalman gain matrix $K_k$ to be reduced, applying a heavy smoothing to the iterative calculations.

According to an alternative embodiment of the invention, a separate Kalman filter "core" is implemented within position engine 42, to generate separate estimates of position and velocity uncertainties using the time-varying measurement noise covariance $R_k$ from measurement engine 40 in combination with a dynamic process noise estimate $Q_k^*$ in which "realistic" (i.e., time-varying) dynamics of navigation system 20, including those based on user inputs, are reflected. This separate Kalman filter "core" can be realized in hardware by parallel processor hardware within position engine 42, or alternatively by a parallel or pipelined computing process relative to Kalman filter process 115. It is contemplated that those skilled in the art having reference to this specification will be readily able to realize such a separate Kalman filter core in a manner well-suited for particular applications.

Figure 7C:
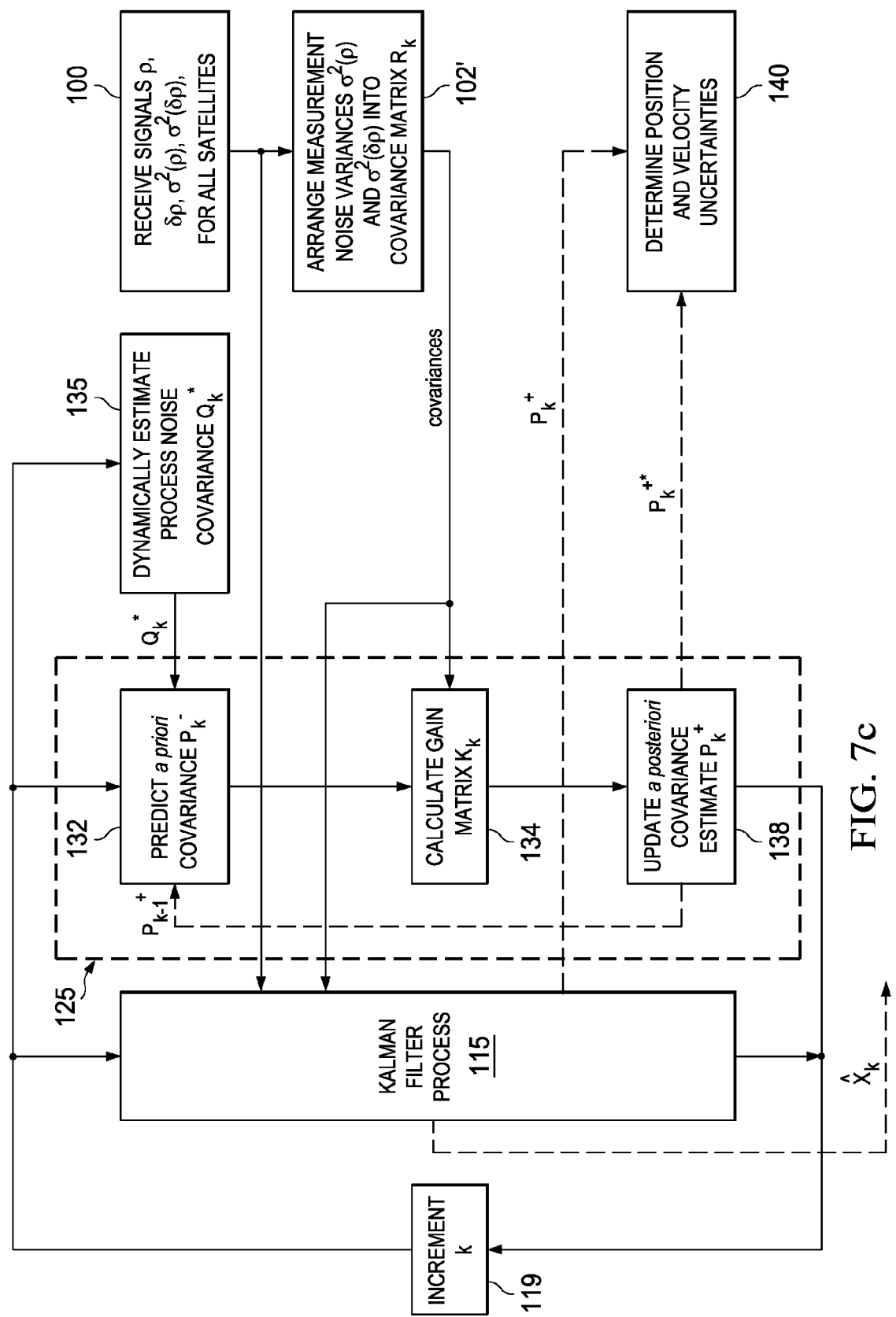

FIG. 7c illustrates the operation of a parallel approach according to this alternative embodiment of the invention. In this arrangement, separate Kalman filter process 125 is shown as performed in parallel with Kalman filter process 115 described above in connection with FIG. 7b. Kalman filter process 125 includes processes 132, 134, 138, which correspond to respective processes 112, 114, 118 of Kalman filter process 115 (FIG. 7b), and which are similarly iteratively executed by process engine 42 for each time interval, indexed by index k as in Kalman filter process 115. According to this embodiment of the invention, however, process 135 is also performed by process engine 42 to dynamically estimate changes in the process noise of navigation system 20, including any actual user dynamics, such as those corresponding to the mode of travel (i.e., motion by vehicle, pedestrian movement, bicycle, etc.). Process 135 may simply select process noise covariance matrix $Q_k^*$ from among a set of predetermined covariance matrices stored in data memory 25d or elsewhere, each covariance matrix associated with one of the navigational modes (vehicle, pedestrian, bicycle, etc.); the selected predetermined covariance matrix would then be selected in process 135. Alternatively, position engine 42 may perform process 135 by deriving process noise covariance matrix $Q_k^*$ in n a manner that accounts for the actual user dynamics. For example, signals from inertial measurement unit 30 (FIG. 2) may be used by position engine 42 to derive process noise covariance matrix $Q_k^*$, in this case based on inertial measurements of position and velocity. In any case, the values of that process noise covariance matrix $Q_k^*$ determined by position engine 42 in process 135 are forwarded to process 132 for the corresponding time interval.

In process 132, as in the case of process 112 described above, a priori estimate of covariance matrix $P_k^-$ is evaluated based on the a posteriori covariance estimate $P_{k-1}^+$ from the previous time interval. But in process 132, this a priori covariance matrix $P_k^-$ estimate is also based on process noise covariance $Q_k^*$ from process 135, which as described above includes dynamic effects in the process noise vector $w_k$. Accordingly, position engine executes process 132 to evaluate the matrix equation:

$$P_k^- = AP_{k-1}^+ A^T + Q_k^*$$

Following process 134, processes 134, 138 of Kalman filter process 125 are then executed by position engine 42 in similar manner as described above in connection with processes 114, 118 of Kalman filter process 115. The result of process 138, specifically, is an a posteriori estimate of covariance matrix $P_k^{+*}$ that includes the effects of dynamic process noise changes as determined by process 135. This filtered a posteriori covariance matrix estimate $P_k^{+*}$ is forwarded to process 140, along with a posteriori covariance matrix estimate $P_k^+$ from process 118 in Kalman filter process 125, from which the uncertainties in position and velocity are determined and converted to the desired frame of reference, in similar manner as described above in connection with process 120. Process 140 may select from between the parallel a posteriori covariance matrix estimates $P_k^+$, $P_k^{+*}$ in determining the final uncertainty values, or may alternatively combine the two estimates in some sort of weighted fashion according to a separate parameter in so doing. It is contemplated that the actual position and velocity output may be based solely on the result of Kalman filter process 115 as shown in FIG. 7c, or alternatively may include some or entirely the contribution of Kalman filter process 125. Those skilled in the art having reference to this specification will readily derive the particular manner in which the parallel results can be best used for particular situations.

According to any of these embodiments of the invention, position engine 42 provides output signals indicative of the current position and velocity of navigation system 20 in its environment, along with measures of uncertainty for each of those position and velocity calculations. In the example of FIG. 3, the position and velocity uncertainty measurements are used by blending EKF function 45 in its overall operation of generating a final position and velocity signal on lines POS_INT for communication by navigation system 20 to the user, or for other purposes within navigation system 20. It is contemplated that blending EKF function 45 will produce the integrated position and velocity signal from a combination of the GPS and inertial position and velocity results, in the extreme case by selecting one or the other of the GPS and inertial results, based on the uncertainties in the GPS position and velocity as determined by position engine 42. For example, if the uncertainties in either or both position and velocity as generated by GPS navigation function 35 according to an embodiment of this invention are relatively large in value, blending EKF 45 will favor the position and velocity determinations generated by inertial navigation system 44 in arriving at the final integrated position and velocity result. Alternatively, these uncertainty values generated by GPS navigation function 35 may be used for other purposes, for example including the adjustment of operational parameters within navigation system 20, triggering warnings or alarms resulting from high uncertainty, or other operations and functions, which will be apparent to those skilled in the art having reference to this specification.

According to embodiments of this invention, therefore, a GNSS navigation system can be constructed and can operate to provide realistic and accurate uncertainty measurements for its position and velocity determinations. These embodiments of the invention provide such realism because, among other reasons, the measurement noise is considered individually and realistically for each satellite signal, and in a manner that contemplates multipath reflected signal propagation. In addition, these improved individual measurement noise estimates are determined in a manner that is compatible with modern Kalman filter-based navigation algorithms, thus obtaining the benefit of that time-dependent approach to navigation. As a result, the resulting uncertainty determination neither underestimates nor overestimates the current signal conditions and environment of the navigation system, improving the ability of the user and the system itself to provide accurate and useful information.

While the present invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as claimed.

What is claimed is:
1. A navigation system, comprising:
an antenna; and
Global Navigation Satellite System (GNSS) receiver circuitry coupled to the antenna for receiving GNSS signals from a plurality of satellites, and comprising:
a measurement engine for determining, from each of the received GNSS signals, a pseudorange value and a pseudorange variance, the measurement engine comprising:

a digital measurement engine channel for determining the pseudorange value and pseudorange variance for an associated one of the GNSS signals, comprising:
  code generator circuitry, for generating a replica code at a plurality of delay times;
  a delay-locked loop for measuring correlation between the associated GNSS signal and the replica code at a selected code-phase relationship, comprising a plurality of correlators, each for correlating the associated GNSS signal with the replica code at an associated delay time, the plurality of correlators including at least an early correlator and a late correlator; and
  a delay-locked loop discriminator having inputs coupled to the plurality of correlators, for generating an error signal responsive to a difference in the correlations by the early and late correlators;
  a filter for generating a discriminator output signal responsive to the error signal and
  circuitry for calculating the pseudorange value from the measured correlations for each GNSS signal, and for calculating the pseudorange variance for each GNSS signal from a variance of the discriminator signal output signal the measured correlations over time.

2. The system of claim 1, wherein the code generator circuitry adjusts the delay times responsive to the discriminator output signal.

3. A navigation system, comprising:
an antenna; and
Global Navigation Satellite System (GNSS) receiver circuitry coupled to the antenna for receiving GNSS signals from a plurality of satellites, and comprising:
  a measurement engine for determining, from each of the received GNSS signals, a measurement value and a measurement variance, the measurement engine comprising:
    a digital measurement engine channel for determining the measurement value and measurement variance for an associated one of the GNSS signals, comprising:
      a feedback loop for measuring correlation between the associated GNSS signal and a replica code at a selected phase relationship; and
      loop discriminator circuitry for adjusting the phase relationship used by the feedback loop responsive to the measured correlation for the associated GNSS signal; and
    circuitry for calculating the measurement value from the measured correlations for each GNSS signal, and for calculating the measurement variance from a variance based on the measured correlations for each GNSS signal;
  wherein the digital measurement engine channel measures a correlation peak value;
  and wherein the calculating circuitry calculates the measurement variance from a variance of measured correlation peak values from a mean correlation peak value.

4. The system of claim 1, wherein the measurement engine is also for determining a delta range value and a delta range variance;
wherein the digital measurement engine channel further comprises:
  a frequency-locked loop for measuring a correlation between the associated GNSS signal and a replica code at a selected carrier-phase relationship; and
  frequency-locked loop discriminator circuitry for adjusting the carrier-phase relationship used by the frequency-locked loop responsive to the measured correlation.

5. The system of claim 1, wherein the GNSS receiver circuitry further comprises:
  a position engine, coupled to the measurement engine, for determining, from the pseudorange values and pseudorange variances, a position of the navigation system and an uncertainty value for the determined position, the position engine comprising:
    circuitry for calculating the position of the navigation system from the pseudorange values from the plurality of GNSS signals; and
    circuitry for calculating the uncertainty value for the position from the pseudorange variances.

6. The system of claim 5, wherein the measurement engine is also for determining a delta range value and a delta range variance from each of the received GNSS signals;
  and wherein the position engine is also for determining, from the delta range values and the delta range variances, a velocity of the navigation system and an uncertainty value for the determined velocity;
  wherein the circuitry for calculating the position of the navigation system calculates that position according to a least-squares solution applied to the pseudorange values, and also calculates the velocity of the navigation system according to a least-squares solution applied to the delta range values from the plurality of GNSS signals;
  and wherein the circuitry for calculating the uncertainty value calculates the uncertainty value for the position by solving a system of equations to which the pseudorange variances are applied in the form of one or more covariance matrices, and also calculates the uncertainty value for the velocity by solving a system of equations to which the delta range variances are applied in the form of one or more covariance matrices.

7. The system of claim 6, wherein the position engine is constructed as programmable logic circuitry;
and further comprising:
  program memory, coupled to the programmable logic circuitry, for storing executable program instructions that, when executed by the programmable logic circuitry of the position engine, cause the position engine to perform a plurality of operations comprising:
    calculating the position and velocity of the navigation system according to a least-squares solution applied to the pseudorange values and delta range values from the plurality of GNSS signals; and
    calculating uncertainty values for the position and velocity by solving a system of equations to which the pseudorange and delta range variances are applied in the form of one or more covariance matrices.

8. The system of claim 1, wherein the measurement engine provides a pseudorange value and a pseudorange variance from the received GNSS signals for each time interval over a sequence of time intervals:
  and wherein the GNSS receiver circuitry further comprises
    a position engine, coupled to the measurement engine, for determining, from the pseudorange values and pseudorange variances, a position of the navigation system and an uncertainty value for the determined position, the position engine comprising:

circuitry for calculating position and position uncertainty values for each of the time intervals by applying the pseudorange values and pseudorange variances for each time interval to a Kalman filter.

9. The system of claim 8, wherein the position engine is constructed as programmable logic circuitry;
wherein the measurement engine is also for determining a delta range value and a delta range variance from each of the received GNSS signals;
and wherein the position engine is also for determining, from the delta range values and the delta range variances, a velocity of the navigation system and an uncertainty value for the determined velocity;
the system further comprising:
program memory, coupled to the programmable logic circuitry, for storing executable program instructions that, when executed by the programmable logic circuitry of the position engine, cause the position engine to perform a plurality of operations in an iterative fashion, each iteration corresponding to a time interval, each iteration comprising the operations of:
calculating a predicted a priori state vector estimate based on an a posteriori state vector estimate from a previous iteration, the state vector estimates including parameters indicating a position, a clock bias value, a velocity, and a clock drift value;
calculating a predicted a priori covariance based on an a posteriori covariance estimate from the previous iteration;
calculating a gain matrix based on a measurement noise covariance corresponding to pseudorange and delta range variances for the GNSS signals in the current time interval;
calculating an a posteriori state vector estimate based on the pseudorange and delta range values for the GNSS signals in the current time interval, on the gain matrix, and on the predicted a priori state vector estimate for the current time interval;
calculating an a posteriori covariance based on the a priori covariance and on the gain matrix;
generating a current position and a current velocity of the navigation system from the a posteriori state vector estimate; and
generating position and velocity uncertainty values from the a posteriori covariance.

10. The system of claim 9, wherein the operation of generating position and velocity uncertainty values from the a posteriori covariance comprises:
selecting values from a matrix arrangement of the a posteriori covariance, the selected values including position and velocity uncertainties in a plurality of dimensions; and
converting the selected values into a directional frame of reference.

11. The system of claim 9, wherein the operation of calculating a predicted a priori covariance is also based on a process noise covariance;
and wherein the plurality of operations further comprises, for each iteration:
dynamically estimating the process noise covariance, prior to the operation of calculating the predicted a priori covariance.

12. The system of claim 9, wherein the system further comprises:
an inertial measurement unit comprising at least one inertial transducer;
an inertial navigation system, coupled to the inertial measurement unit, for determining a position of the navigation system responsive to signals from the inertial measurement unit; and
blending circuitry, coupled to the position engine of the GNSS receiver circuitry and to the inertial navigation system, for generating an integrated position signal from a combination of the GNSS position determined by the position engine and the position determined by the inertial navigation system, responsive to the position uncertainty value from the position engine.

13. A method of determining position based on signals transmitted by satellites in a GNSS system, comprising:
receiving signals from a plurality of satellites over a plurality of time intervals, the received signals comprising encoded information indicative of a time of transmission from each satellite;
for each of the received satellite signals, for each of the time intervals, determining a pseudorange value and a pseudorange variance for each of the received satellite signals, by performing a sequence of operations comprising:
correlating a replica code with the satellite signal at a plurality of delay times to produce a plurality of correlation results;
determining a delay time error value responsive to the values of the plurality of correlation results;
adjusting the delay times of the correlating step responsive to the delay time error value;
repeating the correlating, determining, and adjusting steps;
calculating the pseudorange value from the correlation results; and
calculating the pseudorange variance from a variance of the delay time error values over time; and
for each of the time intervals, determining position and position uncertainty values from the pseudorange values and the pseudorange variances.

14. A method of determining position based on signals transmitted by satellites in a GNSS system, comprising:
receiving signals from a plurality of satellites over a plurality of time intervals, the received signals comprising encoded information indicative of a time of transmission from each satellite;
for each of the received satellite signals, for each of the time intervals, determining a pseudorange value and a pseudorange variance for each of the received satellite signals, by performing a sequence of operations comprising:
correlating a replica code with the satellite signal at a plurality of delay times to produce a plurality of correlation results;
determining a delay time error value responsive to the values of the plurality of correlation results;
adjusting the delay times of the correlating step responsive to the delay time error value;
repeating the correlating, determining, and adjusting steps;
calculating the pseudorange value from the correlation results;
calculating the pseudorange variance, for each of the received satellite signals, by:
measuring a correlation peak value for each time interval; and calculating the pseudorange variance from a variance of measured correlation peak values from a mean correlation peak value for each of the time intervals; and determining position and position uncertainty values from the pseudorange values and the pseudorange variances.

15. The method of claim 13, further comprising:
determining a delta range value and a delta range variance for each of the received satellite signals, by performing a sequence of operations comprising:
  correlating a replica code with a satellite signal at a plurality of frequencies to produce a plurality of correlation results;
  determining a frequency error value responsive to the values of the plurality of correlation results;
  adjusting the frequencies of the correlating step responsive to the frequency error value;
  repeating the correlating, determining, and adjusting steps; and
  calculating the delta range value from the correlation results; and
  calculating the delta range variance from a variance of the frequency error values; and
for each of the time intervals, determining velocity and velocity uncertainty values from the delta range values and delta range variances.

16. The method of claim 15, wherein the steps of determining position, velocity, and uncertainty values for the determined position and velocity comprise:
calculating the position and velocity of the navigation system according to a least-squares solution applied to the pseudorange values and delta range values from the plurality of GNSS signals; and
calculating the uncertainty values for the position and velocity by solving a system of equations to which the pseudorange and delta range variances are applied in the form of one or more covariance matrices.

17. The method of claim 15, wherein the steps of determining position, velocity, and uncertainty values for the determined position and velocity comprise, for each iteration in a plurality of iterations corresponding to a plurality of time intervals:
calculating a predicted a priori state vector estimate based on an a posteriori state vector estimate from a previous iteration, the state vector estimates including parameters indicating a position, a clock bias value, a velocity, and a clock drift value;
calculating a predicted a priori covariance based on an a posteriori covariance estimate from the previous iteration;
calculating a gain matrix based on a measurement noise covariance corresponding to pseudorange and delta range variances for the GNSS signals in the current time interval;
calculating an a posteriori state vector estimate based on the pseudorange and delta range values for the GNSS signals in the current time interval, on the gain matrix, and on the predicted a priori state vector estimate for the current time interval;
calculating an a posteriori covariance based on the a priori covariance and on the gain matrix;
generating a current position and a current velocity of the navigation system from the a posteriori state vector estimate; and
generating position and velocity uncertainty values from the a posteriori covariance.

18. The method of claim 17, wherein the step of generating position and velocity uncertainty values comprises:
selecting values from a matrix arrangement of the a posteriori covariance, the selected values including position and velocity uncertainties in a plurality of dimensions; and
converting the selected values into a directional frame of reference.

19. The method of claim 17, wherein the step of calculating a predicted a priori covariance is also based on a process noise covariance:
and further comprising:
  dynamically estimating the process noise covariance, prior to the operation of calculating the predicted a priori covariance.

20. The method of claim 13, further comprising:
obtaining a measurement from an inertial transducer;
determining a position responsive to the inertial transducer measurement; and
generating an integrated position signal from a combination of the position determined from the received satellite signals and the position determined from the inertial transducer measurement, responsive to the position uncertainty value.

21. A method of determining velocity based on signals transmitted by satellites in a GNSS system, comprising:
receiving signals from a plurality of satellites over a plurality of time intervals, the received signals comprising encoded information indicative of a time of transmission from each satellite;
for each of the received satellite signals, for each of the time intervals, determining a delta range value and a delta range variance for each of the received satellite signals, by performing a sequence of operations comprising:
  correlating a replica code with a satellite signal at a plurality of frequencies to produce a plurality of correlation results;
  determining a frequency error value responsive to the values of the plurality of correlation results;
  adjusting the frequencies of the correlating step responsive to the frequency error value;
  repeating the correlating, determining, and adjusting steps; and
  calculating the delta range value from the correlation results; and
  calculating the delta range variance from a variance of the frequency error values over time; and
for each of the time intervals, determining velocity and velocity uncertainty values from the delta range values and delta range variances.

22. A method of determining velocity based on signals transmitted by satellites in a GNSS system, comprising:
receiving signals from a plurality of satellites over a plurality of time intervals, the received signals comprising encoded information indicative of a time of transmission from each satellite;
for each of the received satellite signals, for each of the time intervals, determining a delta range value and a delta range variance for each of the received satellite signals, by performing a sequence of operations comprising:
  correlating a replica code with a satellite signal at a plurality of frequencies to produce a plurality of correlation results;
  determining a frequency error value responsive to the values of the plurality of correlation results;

adjusting the frequencies of the correlating step responsive to the frequency error value;
repeating the correlating, determining, and adjusting steps; and
calculating the delta range variance, for each of the received satellite signals, from a variance based on the correlation results, by:
measuring a correlation peak value for each time interval; and
calculating the delta range variance from a variance of measured correlation peak values from a mean correlation peak value; and
for each of the time intervals, determining velocity and velocity uncertainty values from the delta range values and delta range variances.

23. A navigation system, comprising:
an antenna; and
Global Navigation Satellite System (GNSS) receiver circuitry coupled to the antenna for receiving GNSS signals from a plurality of satellites, and comprising:
a measurement engine for determining, from each of the received GNSS signals, a pseudorange value, a delta range value, a pseudorange variance, and a delta range variance for each time interval over a sequence of time intervals; and
a position engine, coupled to the measurement engine and constructed from programmable logic circuitry, for determining from the pseudorange values, delta range values, pseudorange variances, and delta range variances, a position and a velocity of the navigation system, and uncertainty values for the determined position and velocity, for each of the time intervals by applying the pseudorange values, delta range values, pseudorange variances, and delta range variances for each time interval to a Kalman filter;
further comprising:
program memory, coupled to the programmable logic circuitry of the position engine, for storing executable program instructions that, when executed by the programmable logic circuitry, cause the position engine to perform a plurality of operations in an iterative fashion, each iteration corresponding to a time interval, each iteration comprising the operations of:
generating estimates of a state vector and a covariance by a plurality of operations comprising:
calculating a predicted a priori state vector estimate for the current iteration based on an a posteriori state vector estimate from a previous iteration, the state vector estimates including parameters indicating a position, a clock bias value, a velocity, and a clock drift value;
calculating a predicted a priori covariance for the current iteration based on an a posteriori covariance estimate from the previous iteration and a process noise covariance;
calculating a gain matrix based on a measurement noise covariance corresponding to pseudorange and delta range variances for the GNSS signals in the current time interval;
calculating an a posteriori state vector estimate for the current iteration based on the pseudorange and delta range values for the GNSS signals in the current time interval, on the gain matrix, and on the predicted a priori state vector estimate for the current iteration; and
calculating an a posteriori covariance for the current iteration based on the a priori covariance and on the gain matrix;
generating dynamic estimates of a state vector and a covariance by a plurality of operations comprising:
dynamically estimating the process noise covariance;
calculating a dynamic predicted a priori covariance for the current iteration based on a dynamic a posteriori covariance estimate from the previous iteration and on the dynamic estimate of the process noise covariance;
calculating a dynamic gain matrix based on a measurement noise covariance corresponding to pseudorange and delta range variances for the GNSS signals in the current time interval and on the dynamic predicted a priori covariance; and
calculating a dynamic a posteriori covariance for the current iteration based on the dynamic predicted a priori covariance and on the dynamic gain matrix;
generating a current position and a current velocity of the navigation system from the a posteriori state vector estimate;
generating position and velocity uncertainty values based on the a posteriori covariance and the dynamic a posteriori covariance.

24. The system of claim 23, wherein the operation of generating position and velocity uncertainty values from the a posteriori covariance comprises:
selecting values from a matrix arrangement of the a posteriori covariance, the selected values including position and velocity uncertainties in a plurality of dimensions; and
converting the selected values into a directional frame of reference.

25. The system of claim 23, wherein the measurement engine comprises:
a plurality of digital measurement engine channels, each digital measurement engine channel for determining the pseudorange value, delta range value, pseudorange variance, and delta range variance for one of the GNSS signals, each of the digital measurement engine channels comprising:
a delay-locked loop for measuring a correlation between an associated GNSS signal and a replica code at a selected code-phase relationship;
delay-locked loop discriminator circuitry for adjusting the code-phase relationship used by the delay-locked loop responsive to the measured correlation;
a frequency-locked loop for measuring a correlation between the associated GNSS signal and a replica code at a selected carrier-phase relationship; and
frequency-locked loop domain discriminator circuitry for adjusting the carrier-phase relationship used by the frequency-locked loop responsive to the measured correlation; and
circuitry for calculating the pseudorange values and delta range values from the measured correlations.

26. The system of claim 25, wherein each of the digital measurement engine channels comprises:
signal-to-noise ratio measurement circuitry, for measuring a signal-to-noise ratio of the associated GNSS signal;
and wherein the calculating circuitry calculates the pseudorange variances and delta range variances from the measured signal-to-noise ratio.

27. The system of claim 25, wherein the calculating circuitry calculates the pseudorange variances from a variance of the discriminator signal from the delay-locked loop discriminator circuitry, and calculates the delta range variances from a variance of a discriminator signal generated by the frequency-locked loop domain discriminator circuitry.

28. A navigation system, comprising:
an antenna; and
Global Navigation Satellite System (GNSS) receiver circuitry coupled to the antenna for receiving GNSS signals from a plurality of satellites, and comprising:
a measurement engine for determining, from each of the received GNSS signals, a pseudorange value, a delta range value, a pseudorange variance, and a delta range variance for each time interval over a sequence of time intervals, the measurement engine comprising:
a plurality of digital measurement engine channels, each digital measurement engine channel for determining the pseudorange value, delta range value, pseudorange variance, and delta range variance for one of the GNSS signals, each of the digital measurement engine channels comprising:
a delay-locked loop for measuring a correlation between an associated GNSS signal and a replica code at a selected code-phase relationship;
delay-locked loop discriminator circuitry for adjusting the code-phase relationship used by the delay-locked loop responsive to the measured correlation;
a frequency-locked loop for measuring a correlation between the associated GNSS signal and a replica code at a selected carrier-phase relationship; and
frequency-locked loop domain discriminator circuitry for adjusting the carrier-phase relationship used by the frequency-locked loop responsive to the measured correlation; and
circuitry for calculating the pseudorange values and delta range values from the measured correlations; and
a position engine, coupled to the measurement engine, for determining from the pseudorange values, delta range values, pseudorange variances, and delta range variances, a position and a velocity of the navigation system, and uncertainty values for the determined position and velocity, for each of the time intervals by applying the pseudorange values, delta range values, pseudorange variances, and delta range variances for each time interval to a Kalman filter;
wherein each digital measurement engine channel measures a correlation peak value;
and wherein the calculating circuitry calculates the pseudorange variance from a variance of measured correlation peak values from a mean correlation peak value.

29. The system of claim 23, wherein the system further comprises:
an inertial measurement unit comprising at least one inertial transducer;
an inertial navigation system, coupled to the inertial measurement unit, for determining a position of the navigation system responsive to signals from the inertial measurement unit; and
blending circuitry, coupled to the position engine of the GNSS receiver circuitry and to the inertial navigation system, for generating an integrated position and velocity signal from a combination of the GNSS position and velocity determined by the position engine, and the position determined by the inertial navigation system, responsive to the position and velocity uncertainty values from the position engine.

30. A method of determining position and velocity based on signals transmitted by satellites in a GNSS system, comprising:
receiving signals from a plurality of satellites over a plurality of time intervals, the received signals comprising encoded information indicative of a time of transmission from each satellite;
for each of the received satellite signals, for each of the time intervals, determining a pseudorange value, a delta range value, a pseudorange variance, and a delta range variance; and
for each of the time intervals, applying the pseudorange value, the delta range value, the pseudorange variance, and the delta range variance to a Kalman filter to derive the position and velocity, and to derive position and velocity uncertainty values, comprising, for each time interval:
generating estimates of a state vector and a covariance by:
calculating a predicted a priori state vector estimate for the current time interval based on an a posteriori state vector estimate from a previous time interval, the state vector estimates including parameters indicating a position, a clock bias value, a velocity, and a clock drift value;
calculating a predicted a priori covariance for the current time interval based on an a posteriori covariance estimate from the previous time interval and a process noise covariance;
calculating a gain matrix based on a measurement noise covariance corresponding to pseudorange and delta range variances for the GNSS signals in the current time interval;
calculating an a posteriori state vector estimate for the current time interval based on the pseudorange and delta range values for the GNSS signals in the current time interval, on the gain matrix, and on the predicted a priori state vector estimate for the current time interval; and
calculating an a posteriori covariance for the current time interval based on the a priori covariance and on the gain matrix;
generating dynamic estimates of a state vector and a covariance by:
dynamically estimating the process noise covariance;
calculating a dynamic predicted a priori covariance for the current time interval based on a dynamic a posteriori covariance estimate from the previous time interval and on the dynamic estimate of the process noise covariance;
calculating a dynamic gain matrix based on a measurement noise covariance corresponding to pseudorange and delta range variances for the GNSS signals in the current time interval and on the dynamic predicted a priori covariance; and
calculating a dynamic a posteriori covariance for the current time interval based on the dynamic predicted a priori covariance and on the dynamic gain matrix;
generating a current position and a current velocity of the navigation system from the a posteriori state vector estimate; and
generating position and velocity uncertainty values based on the a posteriori covariance and the dynamic a posteriori covariance.

31. The method of claim 30, wherein the step of generating position and velocity uncertainty values comprises:

selecting values from a matrix arrangement of the a posteriori covariance, the selected values including position and velocity uncertainties in a plurality of dimensions; and converting the selected values into a directional frame of reference.

32. The method of claim 30, wherein the step of determining the pseudorange value and the pseudorange variance comprises, for each of the received satellite signals:

correlating a replica code with a satellite signal at a plurality of delay times to produce a plurality of correlation results;

determining a delay time error value responsive to the values of the plurality of correlation results;

adjusting the delay times of the correlating step responsive to the delay time error value;

repeating the correlating, determining, and adjusting steps; and calculating the pseudorange value from the correlation results;

and wherein the step of determining the delta range value and the delta range variance comprises, for each of the received satellite signals:

correlating a replica code with a satellite signal at a plurality of frequencies to produce a plurality of correlation results;

determining a frequency error value responsive to the values of the plurality of correlation results;

adjusting the frequencies of the correlating step responsive to the frequency error value;

repeating the correlating, determining, and adjusting steps; and calculating the delta range value from the correlation results.

33. The method of claim 32, wherein the step of determining the pseudorange value, the delta range value, the pseudorange variance, and the delta range variance further comprises, for each of the received satellite signals:

measuring a signal-to-noise ratio of the received signal;

calculating the pseudorange variance and the delta range variance from the signal-to-noise ratio.

34. The method of claim 32, wherein the step of determining the pseudorange value, the delta range value, the pseudorange variance, and the delta range variance further comprises, for each of the received satellite signals:

calculating the pseudorange variance from a variance of the delay time error; and calculating the delta range variance from a variance of the frequency error.

35. A method of determining position and velocity based on signals transmitted by satellites in a GNSS system, comprising:

receiving signals from a plurality of satellites over a plurality of time intervals, the received signals comprising encoded information indicative of a time of transmission from each satellite;

determining the pseudorange value and the pseudorange variance comprises, for each of the received satellite signals:

correlating a replica code with a satellite signal at a plurality of delay times to produce a plurality of correlation results;

determining a delay time error value responsive to the values of the plurality of correlation results;

adjusting the delay times of the correlating step responsive to the delay time error value;

repeating the correlating, determining, and adjusting steps; and calculating the pseudorange value from the correlation results;

determining the delta range value and the delta range variance comprises, for each of the received satellite signals:

correlating a replica code with a satellite signal at a plurality of frequencies to produce a plurality of correlation results;

determining a frequency error value responsive to the values of the plurality of correlation results;

adjusting the frequencies of the correlating step responsive to the frequency error value;

repeating the correlating, determining, and adjusting steps; and calculating the delta range value from the correlation results;

for each of the time intervals, applying the pseudorange value, the delta range value, the pseudorange variance, and the delta range variance to a Kalman filter to derive the position and velocity, and to derive position and velocity uncertainty values;

wherein the step of determining the pseudorange value, the delta range value, the pseudorange variance, and the delta range variance further comprises, for each of the received satellite signals:

measuring a correlation peak value for each time interval; and calculating the pseudorange variance from a variance of measured correlation peak values from a mean correlation peak value.

36. The method of claim 30, further comprising:

obtaining a measurement from an inertial transducer;

determining a position responsive to the inertial transducer measurement; and generating an integrated position and velocity signal from a combination of the position and velocity determined from the received satellite signals, and the position determined from the inertial transducer measurement, responsive to the position and velocity uncertainty values.

* * * * *